United States Patent

Gannett et al.

[15] 3,668,622

[45] June 6, 1972

[54] FLIGHT MANAGEMENT DISPLAY

[72] Inventors: James R. Gannett, Redmond; Gordon D. Annin, Bellevue; Bradley K. Gjerding, Seattle, all of Wash.

[73] Assignee: The Boeing Company, Seattle, Wash.

[22] Filed: May 21, 1970

[21] Appl. No.: 39,370

[52] U.S. Cl..................................340/27 R, 178/DIG. 20
[51] Int. Cl.........................................................H01r 13/44
[58] Field of Search............340/27 R, 27 SS, 27 AT, 27 NA; 178/DIG. 20

[56] References Cited

UNITED STATES PATENTS 3,521,227   7/1970   Congleton et al.........................340/27
3,521,228   7/1970   Congleton et al.........................340/27

Primary Examiner—Ralph D. Blakeslee
Attorney—Christensen, Sanborn & Matthews

[57] ABSTRACT

Pilot-oriented information is displayed on the screen of a cathode ray tube by electronically generated symbols superimposed on a simulated or real-world picture. The symbology uses as one datum a fixed airplane symbol and locates therefrom the airplane's degree of pitch, degree of roll, and the horizon. In addition, symbols are provided to indicate the relative position of the airplane with respect to ILS localizer and glide slope signals, pitch and roll commands obtained from an on-board flight director computer, a desired pitch reference, and actual as well as potential flight path angle. Deviation from a preset airspeed and radio or radar altitude are also shown. In all cases, the symbols are constructed by symbol generators from one or more basis rectangles, whose width is determined by a pulse of appropriate length during the CRT's horizontal scanning period, and whose height is determined by a similar pulse during the vertical scanning period. The location of each rectangle is determined by the delay between the start of the vertical or horizontal scanning period, and the start of the vertical or horizontal pulse. Modifications are described for generating rotating symbols. The outputs of the symbol generators are combined as a priority circuit and converted into a composite video signal by a video mixer.

19 Claims, 33 Drawing Figures

| FIG. | BLOCK | FUNCTION | INPUT | OUTPUT |
|---|---|---|---|---|
| | 10 | TV CAMERA | REAL WORLD IMAGE | TV SIGNAL |
| | 12 | RECEIVER | ILS SIGNALS | LOC DEV., G/S DEV. |
| | 13 | DISPLAY CONTROL | PILOT | SS |
| | 14 | FLIGHT DIRECTOR COMPUTER | | $\theta, \phi$ CMD. |
| | 16 | SENSOR | | $\Delta V$ |
| | 18 | DISPLAY CONTROL | PILOT | MDA |
| | 20 | RECEIVER | RADIO ALTITUDE SIGNAL | h |
| | 22 | SENSORS | $\theta \phi$ GYROS | $\theta$, SIN $\phi$, COS $\phi$ |
| | 23 | DISPLAY CONTROL | PILOT | PS1, PS2 |
| | 24 | DISPLAY CONTROL | PILOT | $\theta$ REF. |
| | 26 | DISPLAY CONTROL | PILOT | SMD |
| | 28 | SENSOR | | $\gamma$ |
| | 29 | SENSOR | | DA |
| | 30 | SENSOR | | V |
| 10 | 32 | SYMBOL GENERATOR | SH, N1, N1'···N4', HD | A/P |
| | 34 | COUNTER | HD, VD | N1, N1'···N4, N4' |
| 11 | 36 | SYMBOL GENERATOR | SH, LOC DEV, G/S DEV, HD, VD | ILS GATE |
| 12 | 38 | SYMBOL GENERATOR | SH, $\theta, \phi$ CMD, HD, VD | CMD BAR |
| 13 | 40 | SYMBOL GENERATOR | SH, $\Delta V$, HD, VD | S/E |
| 16 | 42 | SYMBOL GENERATOR | D1, D2, D3, U, V, W, A, C, E, L, J, G | RAN |
| 15 | 44 | SYMBOL GENERATOR | MDA, h, HN, BT | RAB, A, C, E, L, J, G |
| | 46 | COUNTER | HD, VD | U, V, W |
| | 48 | A/D CONVERTER | h | D1, D2, D3 |
| 14 | 50 | SYMBOL GENERATOR | HD, VD | HN, BT |
| 17 | 52 | SAWTOOTH WAVEFORM GENERATOR | SH, $\theta$, SIN $\phi$, COS $\phi$, HD, VD, PS1, PS2 | VCST1, VCST2, HCST1, HCST2 |
| 21 | 54 | SYMBOL GENERATOR | VCST2, HCST2, PS1, PS2, DA, $\gamma$, V | F/P |
| 19 | 56 | SYMBOL GENERATOR | SMD, HCST2 | MIDL, MADL |
| 20 | 58 | SYMBOL GENERATOR | MIDL, MADL, VCST2, $\theta$ REFL | AHL, POSPL, NEGPL, SGS, $\theta$ REFL |
| 22 | 60 | SYMBOL GENERATOR | $\theta$ REF, HD, VCST2 | $\theta$ REFL |
| 18 | 62 | SYMBOL GENERATOR | VCST1, HCST1 | RM |
| 8 | 70 | PRIORITY CIRCUIT | A/P, ILS GATE, CMD BAR, S/E, F/P, RAN, RAB, POSPL, NEGPL, AHL, RM, SGS, FDL, SEL, FPL, RAL, ILSL, TVL1, FDS, SS, PS | W1, W2, W3, W4, W5, W6, TVL2, SKY, GROUND |
| 7 | 72 | CONTROL CIRCUIT | RAM, TVM, FDM, ILSM, AS, LOCA, LOCB | TVL1, FDL, SEL, ILSL, FPL, RAL |
| | 74 | SYMBOL SHIFT GENERATOR | TVL1 | SH |
| | 78 | SYNC GENERATOR | | SYNC, BL, HD, VD |
| 9 | 80 | VIDEO MIXER | TVSIG, TVL2, W1, W2, W3, W4, W5, W6, SKY, GROUND, SYNC, BL | EADI VID |

*Fig. 6.*

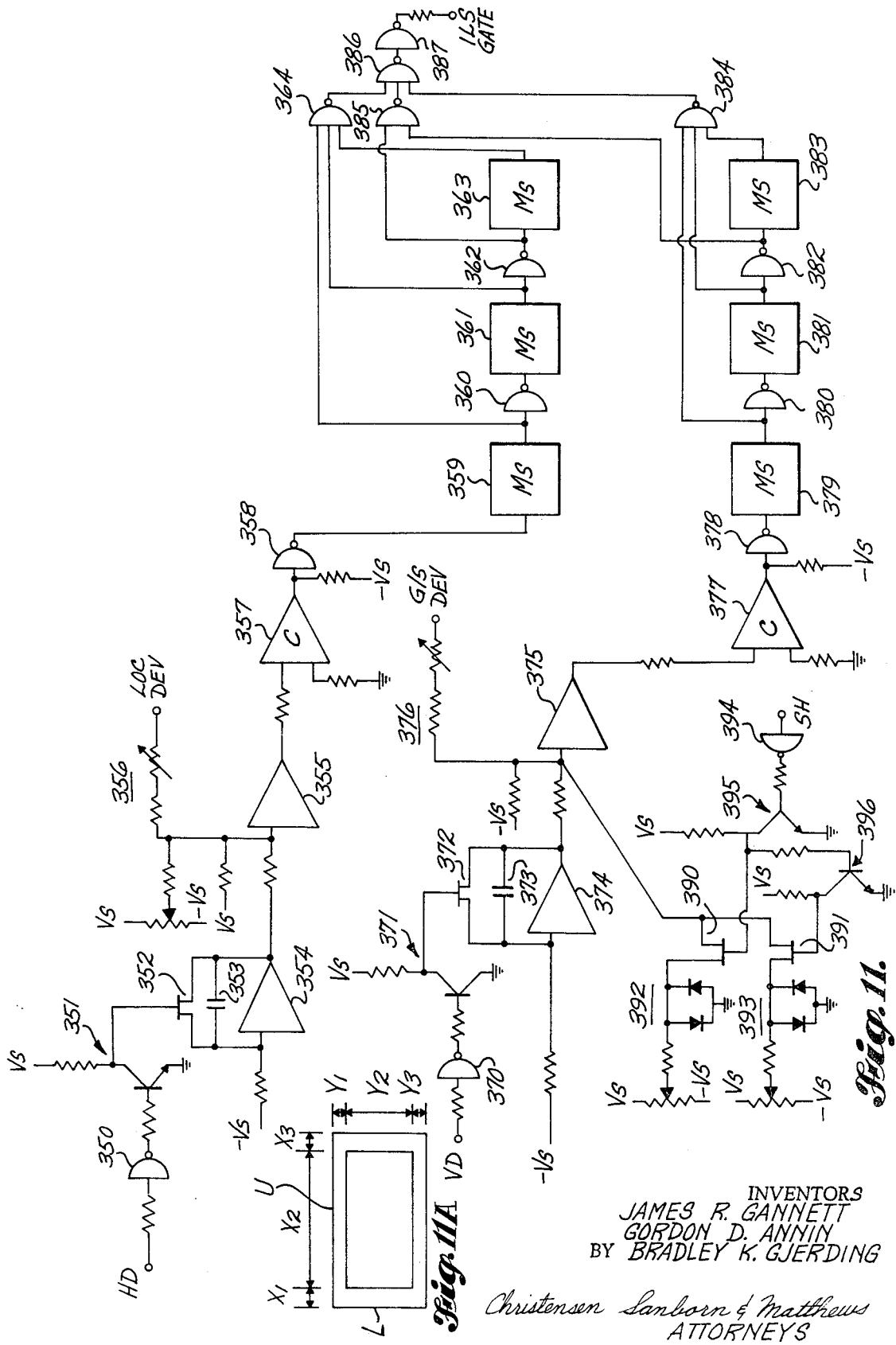

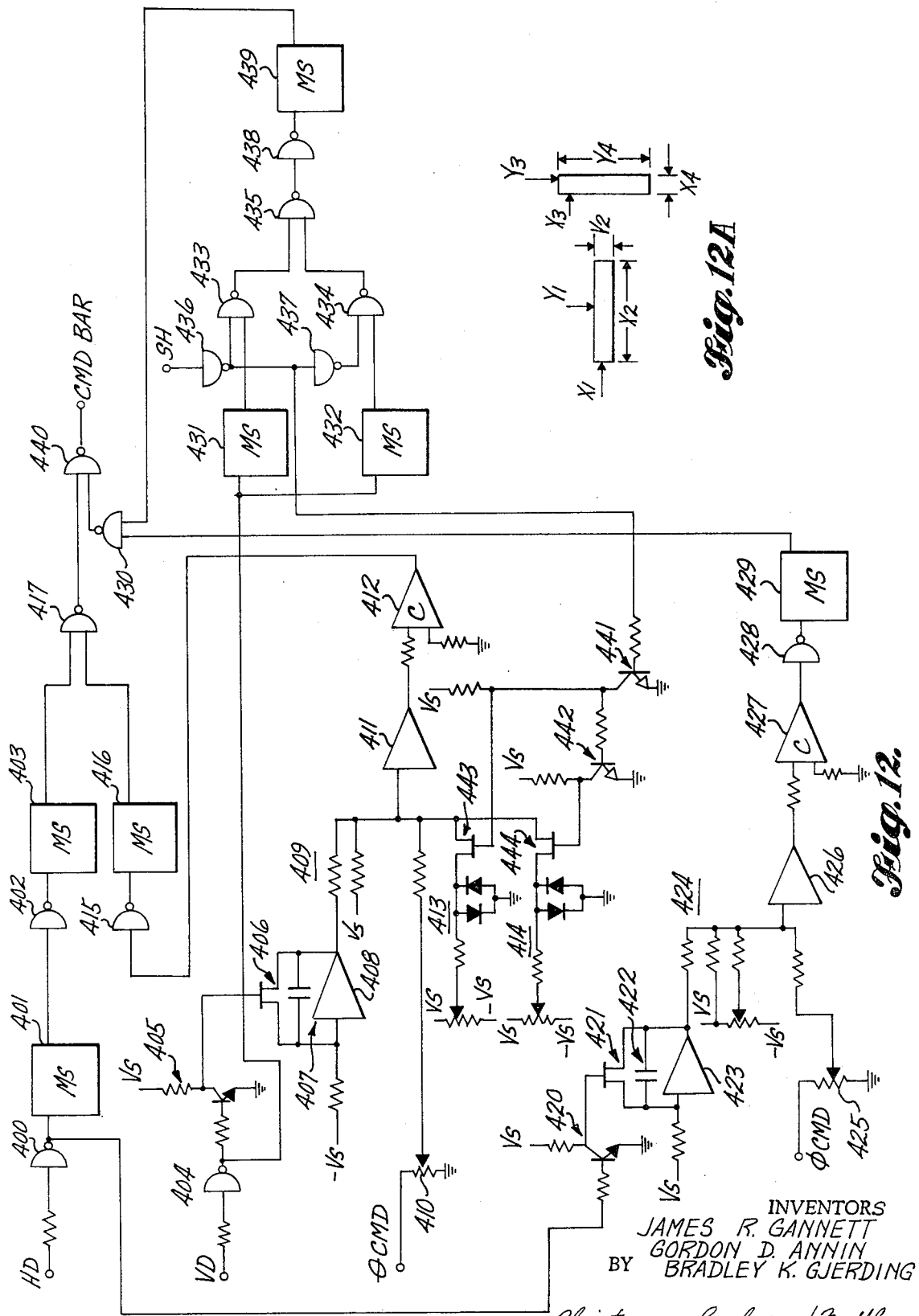

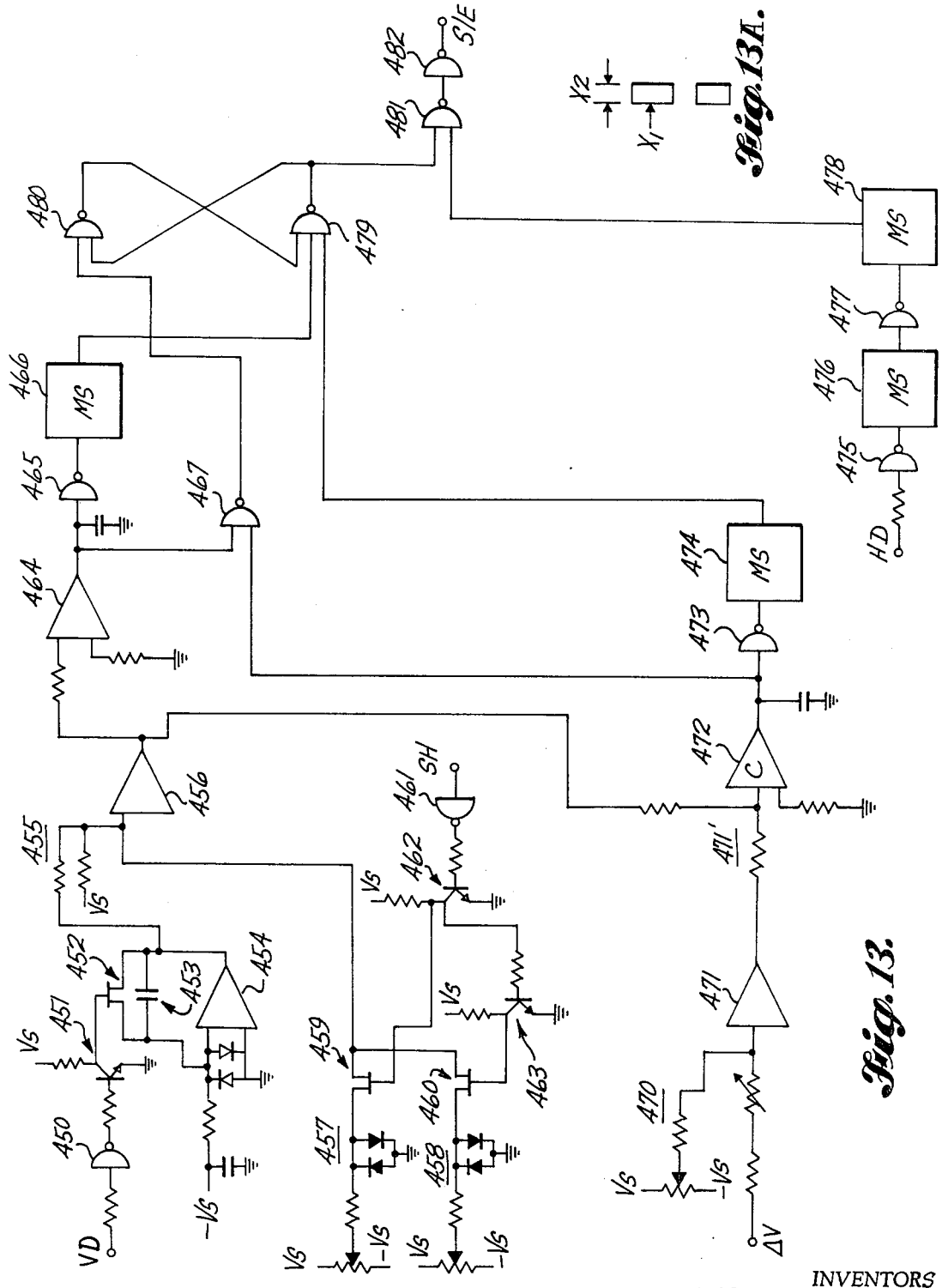

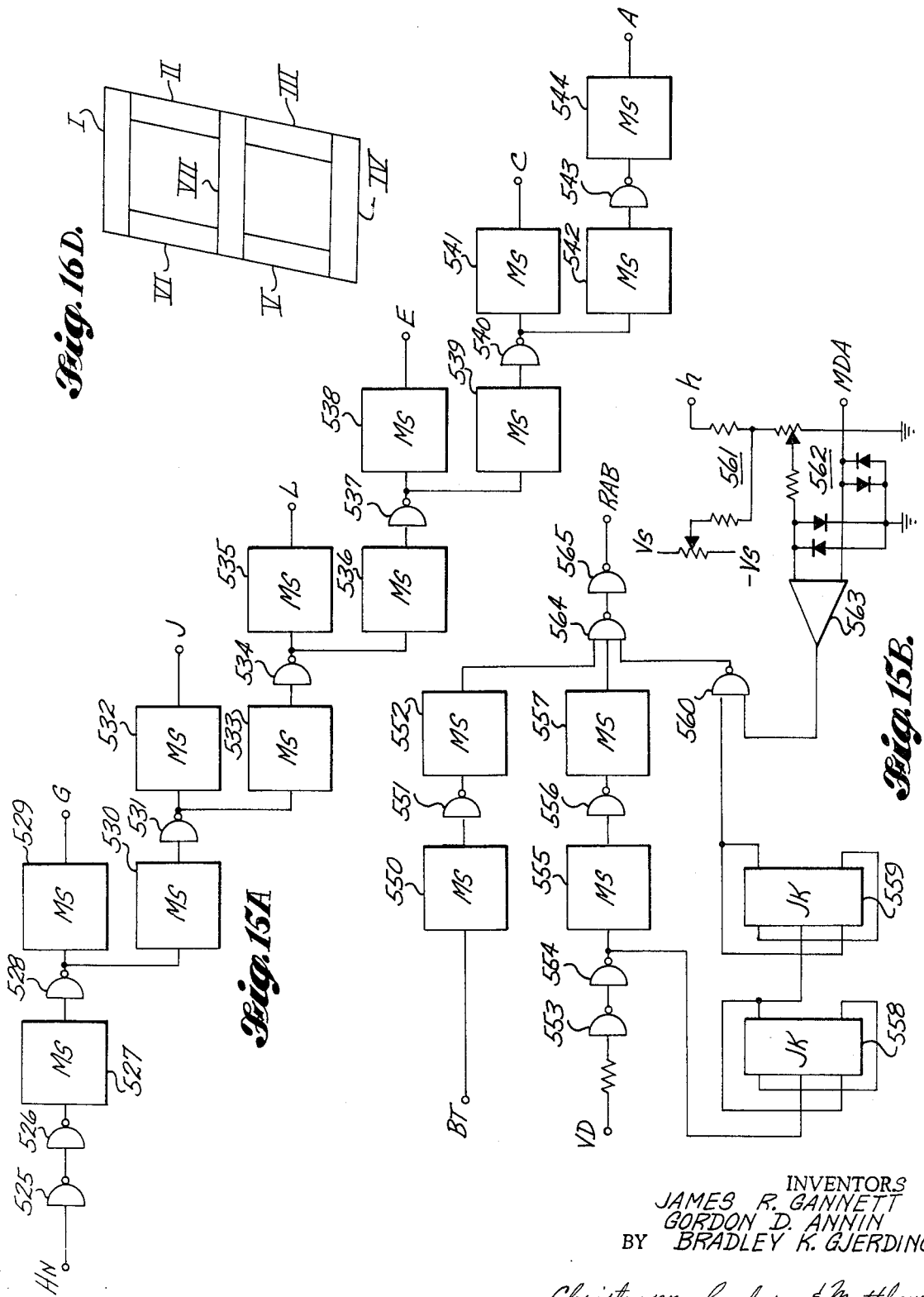

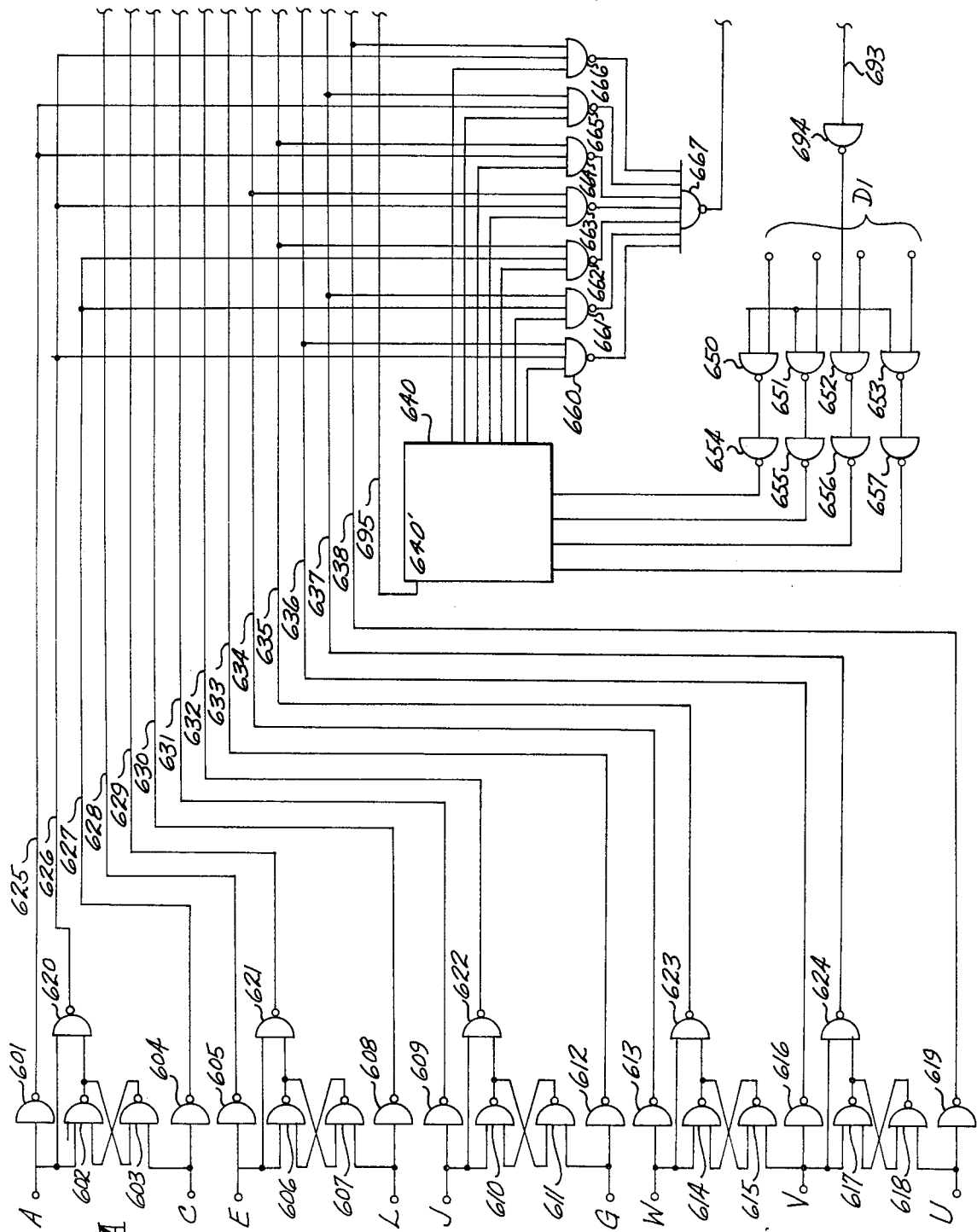

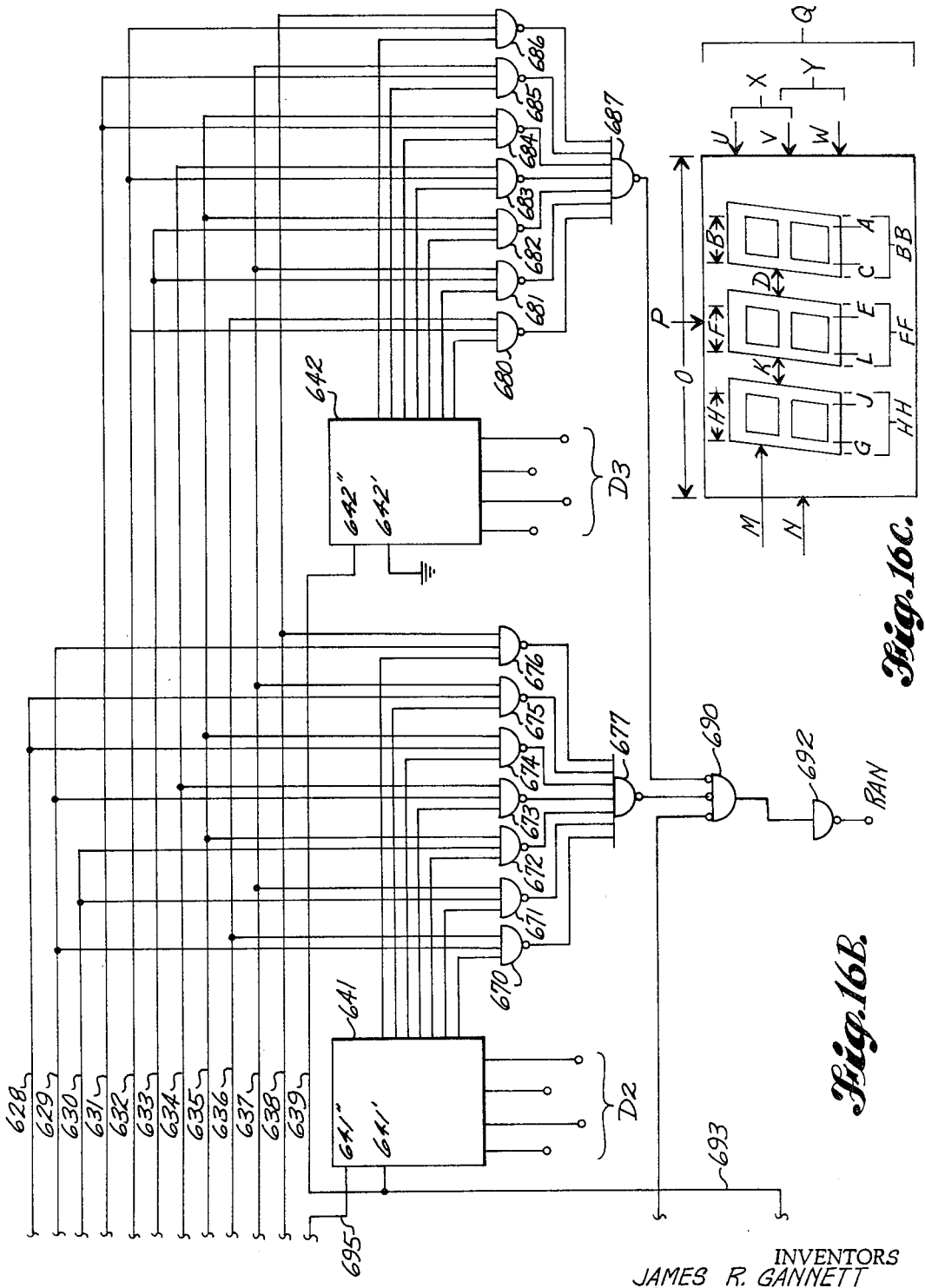

FLIGHT MANAGEMENT DISPLAY

BACKGROUND OF THE INVENTION

This invention generally relates to display systems and an aircraft cockpit display using a cathode ray tube.

In the piloting of aircraft, it has long been necessary to supplement or replace the pilot's visual or VFR analysis and resultant guidance of an aircraft by means of suitable instrumentation. Widespread use has been made in commercial aircraft to date of instruments providing altitude information, obtained from radio or radar sensors, and instruments indicating the relative location of the aircraft with respect to instrument landing system or ILS signals. An instrument for supplementing "seat of the pants" flying is the attitude director indicator which comprises a fixed airplane replica and a gyroscopically controlled sphere. A grid is marked on the spherical surface in degrees of pitch, or the degree of inclination of the aircraft in a forward direction relative to the horizon, and in degrees of roll, or the degree of inclination of the aircraft in a sideways or horizontal direction relative to the horizon. By reading the airplane replica against the relatively moving spherical surface, the pilot can obtain a rough indication of the aircraft's pitch and roll attitude.

More recently, there has been provided an on-board flight director computer which is programmed for a desired flight path angle and heading or radio course. Such computers have been used to supply a visual indication to the pilot of desirable pitch and roll attitude.

With the advent of the supersonic transport, these segmented approaches to instrumentation for pilot flight analysis and guidance have become inadequate, for the simple reason that they have not been coordinated to quickly provide the information that the pilot actually needs in order to make a decision during crucial aspects of the flight. Particularly is this so during take-off, and again during landing. The higher speeds involved in these maneuvers simply demand that the pilot not devote a large amount of time to the consideration of many diverse instruments whose displays must be individually interpreted, digested and remembered in order for an adequate decision to be made. Moreover, the displays currently in use do not possess a refinement or precision of measurement necessary in certain critical maneuvers during flight. For example, the present attitude director indicators do not provide scaling of pitch attitude greater than 30° per inch. However, by using visual or UFR techniques, the pilot can usually scale down to 2° per inch of pitch attitude.

Thus, present flight instrumentation lacks in human engineering, that is, it fails to provide flight information in a form that can be readily integrated into the pilot's analysis and decision process. For this reason, pilots have heretofore relied on a combination of visual and instrument techniques. With the speed and dimensions of the supersonic transport, visual techniques assume less importance and reliability and thus the pilot is left at critical aspects of the flight with incomplete flight information.

It is not feasible to modify presently available mechanical attitude director indicators to provide all the information needed for an integrated display, because such mechanical devices are inherently limited to 2 or 3° of motion. There have been proposed a great number of electronic systems for providing integrated displays of this type. However, none of these systems have been adapted to the problems associated with the piloting of commercial transports. These systems have varied in complexity from simulations of the ground, with perhaps an indication of the horizon, through those superimposing on such a combined ground and horizon simulation a display of pitch and roll attitude symbols, or other information, to those superimposing information upon a television picture of the real world immediately preceding the aircraft. In this latter category, there have also been systems which mechanically superimpose pitch and roll attitude information upon a real world television image and those which electronically superimpose pitch and roll attitude information upon a real world image which is optically coupled.

Although these displays have integrated some of the instrumentation described previously, not one has been uniquely adapted to the pilot's need for information and his ability to interpret. In addition, many of the techniques used for electronically generating the superimposed information have not been sophisticated enough to permit precise display of that information. For example, a widespread technique for generating symbols that rotate with change in roll attitude of the aircraft has been to physically rotate the deflection yoke of the cathode ray tube used to generate the display image.

It is therefore an object of this invention to provide an electronically generated, integrated display of attitude and other information, which display can replace the pilot's need for visual information necessary to complete flight management.

It is a further object of this invention to provide such an electronically-generated display whose precision is sufficient to allow the pilot to rely thereon as a primary indication of the information so displayed.

It is yet a further object of this invention to provide such an electronically generated display which superimposes such integrated information upon a real world image obtained by television or other techniques at appropriate times during flight.

SUMMARY OF THE INVENTION

These objects and others, which will be realized from consideration of the detailed discussion in the following portion of the specification, are obtained by providing a unique symbology integrating all necessary pilot-oriented information for use with a single CRT display, and by reproducing that symbology and any real world image by a system which modulates the intensity of the CRT beam in accordance with signals obtained from electronic circuit means whose inputs are provided by sensors responsive to commonly known flight variables and by the pilot, and whose outputs are combined in a suitable priority means and a mixing means into a composite video signal.

BRIEF DESCRIPTION OF THE DRAWINGS

The invention is particularly pointed out and distinctly claimed in the concluding portion of the specification. For a complete understanding of the invention, together with yet further objects and advantages thereof, reference should be made to the following portion of the specification, taken in conjunction with the accompanying drawings in which:

FIG. 6 is a representation, in tabular form, of signal flow between the system elements in FIG. 5;

FIG. 11 is a detailed logic diagram of the ILS gate symbol generating circuit 36 of FIG. 5, and FIG. 11A is a pictorial representation of the basic rectangular units comprising the ILS GATE symbol;

FIG. 12 is a detailed logic diagram of the command bar generating circuit 38 of FIG. 5, and FIG. 12A is a pictorial representation of the basic rectangular units comprising the PITCH COMMAND and ROLL COMMAND symbols;

FIG. 13 is a detailed logic diagram of the speed error symbol generating circuit 40 of FIG. 5, and FIG. 13A is a pictorial representation of the basic rectangular units comprising the SPEED ERROR symbol;

FIGS. 15A and 15B are detailed logic diagrams of the R/A symbol generator "B," or element 44, of FIG. 5;

FIGS. 16A and 16B are detailed logic diagrams of the R/A symbol generating circuit "A," or element 42, of FIG. 5, FIG. 16C is a pictorial representation of the basic rectangular units comprising the ALTITUDE NUMBERS and ALTITUDE BOX symbols, and FIG. 16D is a pictorial representation of a typical seven-segment number;

DESCRIPTION OF A PREFERRED EMBODIMENT

The portion of the specification immediately following explains the type, general operation and purpose, and reading of the symbology. A brief description of the system which produces the display can be found in the portion entitled System Components and Operation. Following that description is a detailed discussion relating to Symbol Generators and Techniques.

GENERAL DESCRIPTION OF SYMBOLOGY

Figure 1:
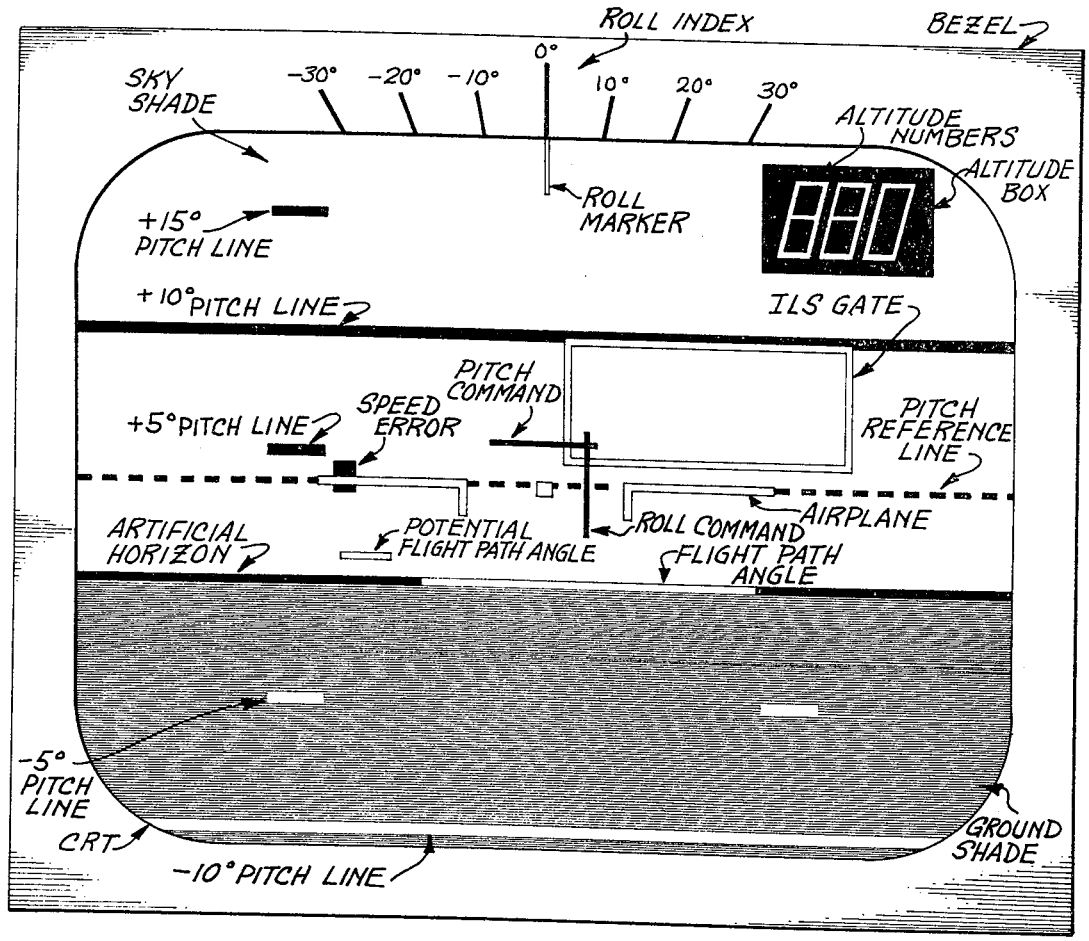
FIGS. 1—4 are pictorial representations of a cathode ray tube screen, showing thereon the symbology of this invention under various operating conditions of an aircraft.

Now referring to FIG. 1, there is shown the face of the flight management display of this invention which comprises a BEZEL surrounding a cathode ray tube, or CRT, on whose screen is displayed a plurality of electronically generated symbols. In some modes of operation of the display, not all the symbols depicted in FIG. 1 are displayed.

The symbols can be divided into two classes: those which rotate with changes in aircraft roll attitude, and those which do not. The latter class comprises a fixed AIRPLANE reference symbol, a PITCH COMMAND symbol, and a ROLL COMMAND symbol, an ILS GATE symbol, a SPEED ERROR symbol, an ALTITUDE BOX symbol, and an ALTITUDE NUMBERS symbol. The former class comprises a plurality of PITCH LINE symbols, a PITCH REFERENCE LINE symbol, a FLIGHT PATH ANGLE symbol, a POTENTIAL FLIGHT PATH ANGLE symbol, an ARTIFICIAL HORIZON symbol, a ROLL MARKER symbol, and SKY SHADE and GROUND SHADE symbols.

The particular symbols shown in FIG. 1, their visual appearance, and their mode of display to be hereinafter described, have been chosen to provide positive and primary flight management information to the pilot.

The AIRPLANE symbol is fixed and is normally centered on the CRT screen, except when a real world image is to be displayed, and most of the other symbols are relatively displaced therefrom according to their informational content. The pitch attitude of the aircraft, which is the angle of inclination thereof in a forward direction with respect to the horizon, is read by visually comparing the location of the ARTIFICIAL HORIZON symbol with respect to the AIRPLANE symbol. Precision in the pitch attitude display is accomplished by the plurality of positive and negative PITCH LINES, which in the embodiment of FIG. 1 occur at intervals of 5°. For example, the aircraft in FIG. 1 has a pitch attitude of approximately +3°. With the system of the invention, even greater precision in pitch attitude can be obtained.

To assist in this process of visual comparison, the areas of the CRT screem immediately above and below the ARTIFICIAL HORIZON symbol are shaded differently to correspond to simulated SKY SHADE and simulated GROUND SHADE. In the embodiment of FIG. 1, the negative PITCH LINES are white, the positive PITCH LINES and ARTIFICIAL HORIZON line are black, the SKY SHADE is a light gray, and the AIRPLANE symbol is white. The visual contrast afforded by these shadings allows the pilot to easily discern the sign and degree of pitch attitude.

The invention also contemplates at least 2° of pitch sensitivity, that is, the pitch increments illustrated in FIG. 1 may be decreased or increased accordingly. Reference should be made to the detailed descriptions of the system and the symbol generators for further operational features of the pitch attitude display symbols.

Figure 3:
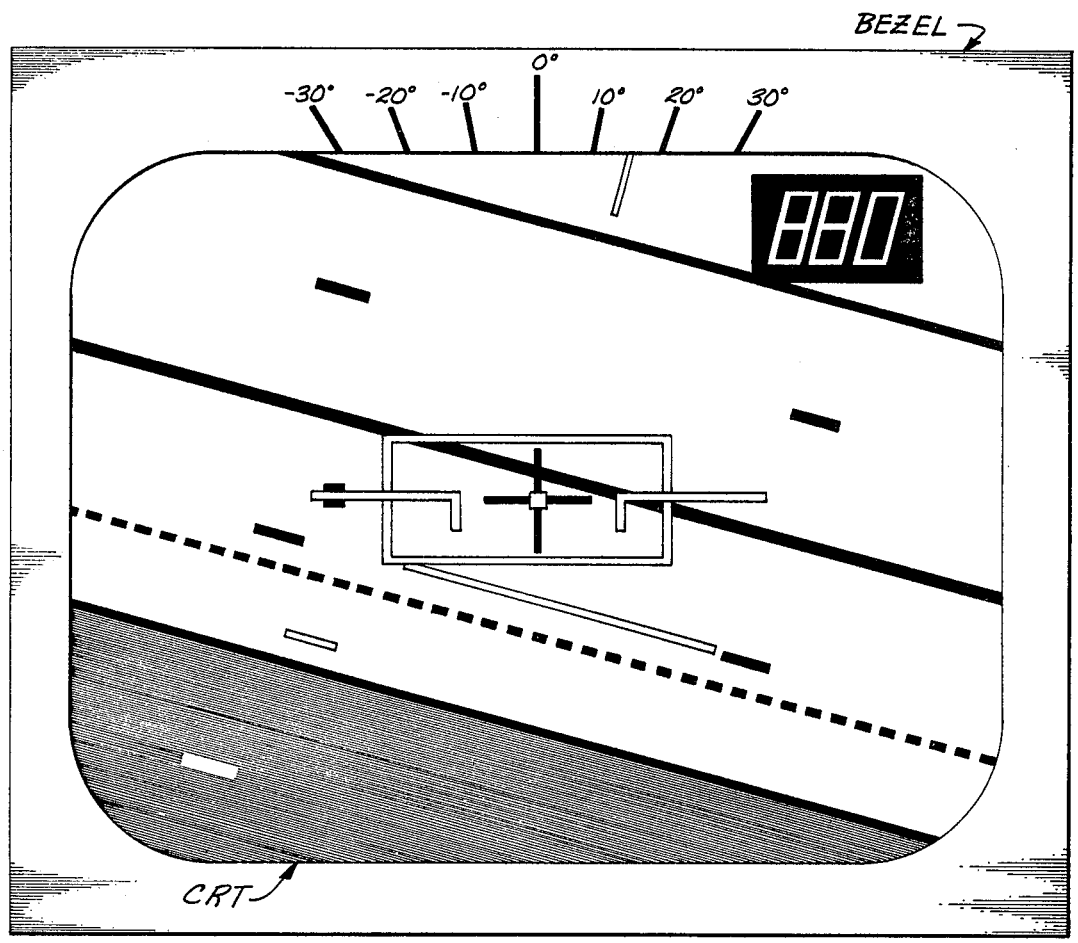

The roll attitude, or angle of inclination of the aircraft in a horizontal direction with respect to the horizon, is measured by comparing the position of the white ROLL MARKER symbol against a ROLL INDEX which is embossed or otherwise imprinted upon the BEZEL surrounding the CRT. Alternatively, the ROLL INDEX may be a separate, electronically generated symbol. In FIG. 3, for example, the aircraft is rolling approximately +15° in a left banking maneuver.

The dashed black PITCH REFERENCE LINE symbol is controlled by the pilot and may be set to assist the pilot in maintaining any desired pitch attitude. In FIG. 1, the line has been set at approximately +3°. In the system embodiment to be described hereinafter, the location of the PITCH REFERENCE LINE symbol may be varied from −10° to +20° pitch attitude.

Figure 2:
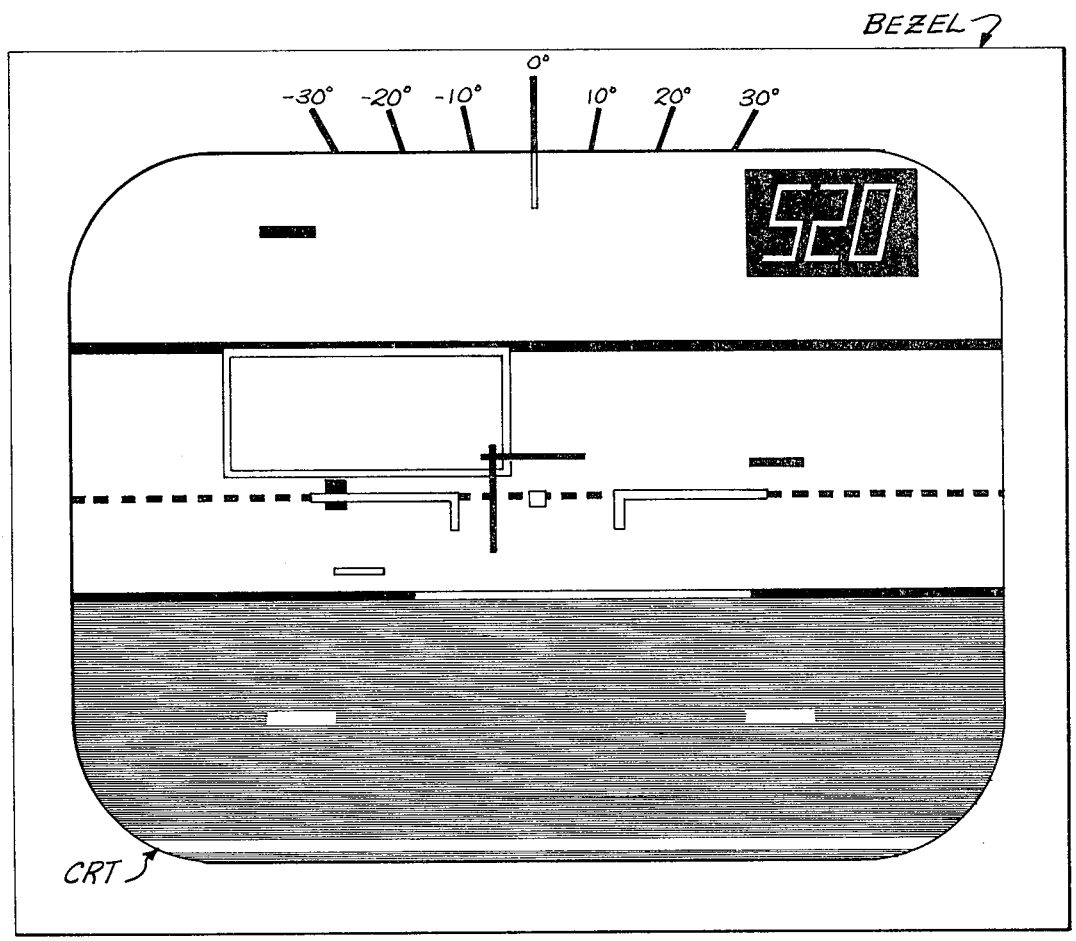

The white ILS GATE symbol is a rectangle which indicates the extent of the glide slope and localizer beam used in the ILS, or instrument landing system. The two horizontal lines of the rectangle indicate permissible positive and negative limits of the aircraft's flight path with respect to the ILS glide slope signal, and the left and right lines indicate acceptable negative and positive limits of the flight path with respect to the ILS localizer signal. The pilot ascertains the relative location of his aircraft with respect to the ILS beam by visually comparing the relative position of the rectangular ILS GATE symbol with respect to the center dot of the AIRPLANE symbol. In FIG. 1, the aircraft is to the left and below the ILS beam and thus beyond acceptable tolerance limits. In FIG. 2, the aircraft is to the right and below the ILS beam. In FIG. 3, the aircraft is flying right on the glide slope signal, but slightly to the right of the localizer signal, although still within acceptable tolerances.

The black PITCH and ROLL COMMAND symbols are obtained from an on-board director computer whose function is to continuously provide command signals representing desired roll and pitch attitudes which, if followed, will cause the aircraft to smoothly achieve a particular course, heading, altitude, or vertical path. Normally, the pilot can achieve a particular mode of flight by scanning several basic instruments, representing barometric pressure, ILS signals, or the like, and generate a mental picture of the airplane's position and rate of approach to a desired datum. The on-board flight director computer simply replaces the pilot in this process and converts the mode and datum selections into pitch and roll attitude signals. As with the ILS GATE symbol, the PITCH COMMAND and ROLL COMMAND signals are read against the center dot of the AIRPLANE symbol. In FIG. 1, the PITCH COMMAND signal calls for an increase in pitch attitude, or a fly-up command, while the ROLL COMMAND symbol calls for a left-banking roll. In FIG. 2, fly-up and bank-left commands are illustrated. In FIG. 3, the symbols are centered on the center dot of the AIRPLANE symbol, and thus all flight director commands have been satisfied.

The white ALTITUDE NUMBERS and black ALTITUDE BOX symbols are to be read together and simply display, in digital form, the output of a radio or radar altitude sensor. The numbers, according to the system embodiment described hereinafter, are displayed in 2-foot increments from 0 to 100 feet and in 10-foot increments from 100 to 1,000 feet. If desired, the display may be blanked at altitudes above 1,000 feet. In addition, a modification allows setting in a minimum decision altitude by the pilot. When that attitude is reached, the ALTITUDE BOX symbol is flashed at regular intervals.

The black SPEED ERROR symbol is obtained from the output of an airspeed sensor into which a desired reference speed has been set. Deviation from the reference airspeed is indicated by the lack of symmetry of the SPEED ERROR symbol about the left wing of the AIRPLANE symbol. In FIG. 1, actual airspeed is slightly above the reference speed. A similar situation exists in FIG. 2. In FIG. 3, actual airspeed is equal to reference airspeed.

The white FLIGHT PATH ANGLE symbol indicates the actual angle of travel of the aircraft through space, with respect to the horizon. The symbol is read by comparing its relative location to the pitch and roll attitude background, and especially with respect to the ARTIFICIAL HORIZON symbol and the positive and negative PITCH LINE symbols. In FIGS. 1 and 2, the aircraft is in level flight; in FIG. 3, the aircraft is climbing and banking to the left, and the actual flight path is approximately 5° above the horizon.

The white POTENTIAL FLIGHT PATH ANGLE symbol, whose theory and operation will be described in more detail hereinafter, is also read with reference to the attitude background. Essentially, the POTENTIAL FLIGHT PATH ANGLE symbol indicates the flight path angle that would be obtained if the present airspeed of the aircraft were maintained. In FIGS. 1 and 2, the aircraft is accelerating, and thus could achieve a flight path of +1° relative to the present flight path of the aircraft with the present airspeed. In FIG. 3, the aircraft is decelerating, and could achieve a flight path of −4° relative to the present flight path, were the present airspeed to be maintained.

The POTENTIAL FLIGHT PATH ANGLE symbol is particularly useful by itself in takeoff and climbing maneuvers. As will be more fully explained hereinafter, if the pilot desires to maintain a constant airspeed for any desired flight path, he must set the thrust of the aircraft so as to move the POTENTIAL FLIGHT PATH ANGLE symbol next to the FLIGHT PATH ANGLE symbol.

Figure 4:
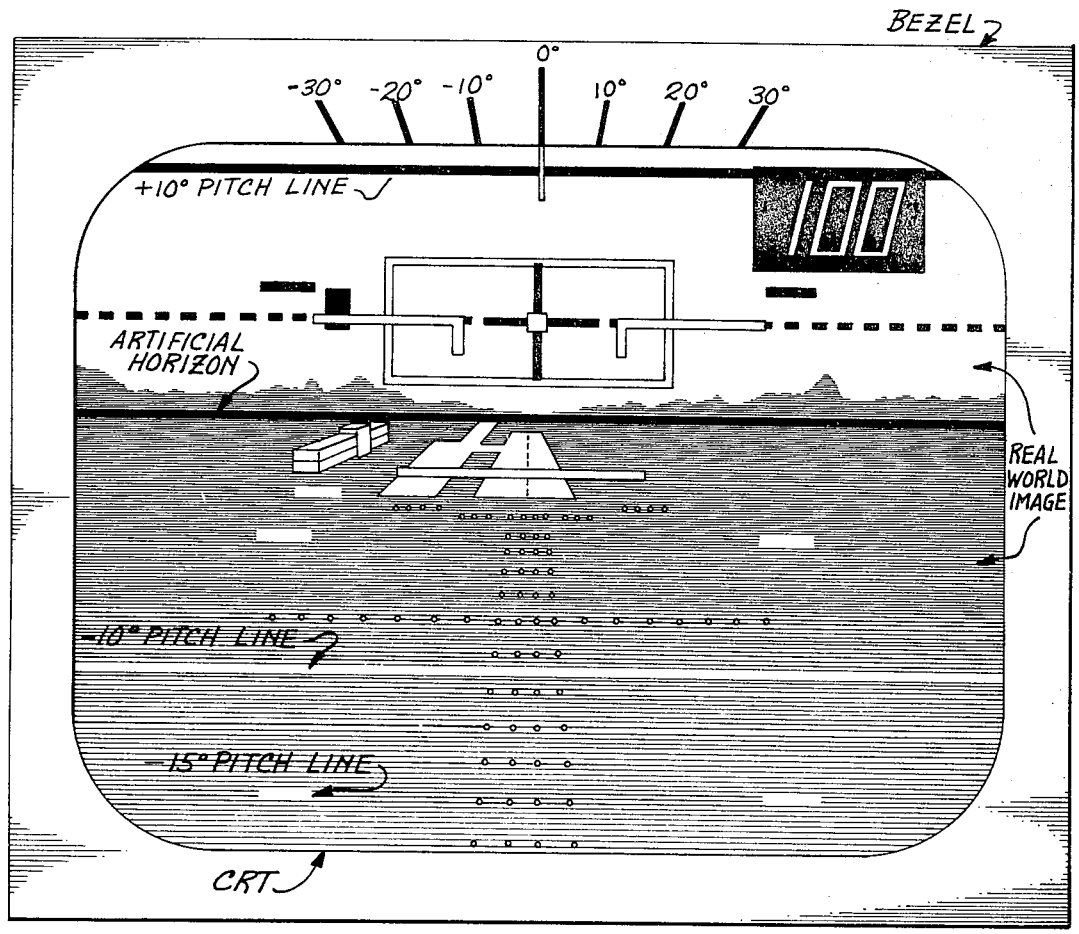

Particularly useful during the descent phase of the flight is an addition of a real world picture to the CRT screen, as best indicated in FIG. 4. The symbology just described is chosen to have a scaling so as to be in 1:1 correspondence with the scaling of the real world picture. A TV camera or a radar system may provide the real world input. Although different modes of operation are contemplated, perhaps the most common mode is that displaying the area immediately preceding and below the aircraft. Such a display aids the pilot in "seeing" the actual touch down point on the runway.

When the real world picture is to be displayed, the position of the AIRPLANE symbol is displaced upwardly from the center of the CRT screen. Of course, those symbols which are read against the AIRPLANE symbol are similarly displaced.

In FIG. 4, it will be noted that the ARTIFICIAL HORIZON symbol corresponds in location with the actual horizon viewed in the real world image. If desired, the portions, or certain portions of the real world image above the horizon may be blanked.

The addition of a real world image has many important effects during the descent phase. First, the pilot can choose a desired touchdown point on the runway, then fly to that point by adjusting his actual flight path angle, as indicated by the FLIGHT PATH ANGLE symbol, to correspond with that desired touchdown point. In FIG. 4, the actual flight path is towards a touchdown point on the runway. However, the POTENTIAL FLIGHT PATH ANGLE symbol indicates that, unless the pilot increases thrust, the projected flight path will bring him to a touchdown point at the edge of the runway. Second, the increased vision afforded by the real world image immediately below the aircraft allows the pilot to ascertain the approach lights of the runway throughout the landing procedure. This information is especially useful as backup to the ILS beam information afforded by the ILS GATE symbol. Third, the pilot can choose a desired touchdown point on the runway and a desired angle of approach thereto, then implement such a landing by adjusting the position of the PITCH REFERENCE LINE symbol to overlay the desired touchdown point on the runway. By keeping the PITCH REFERENCE LINE symbol in correspondence with the desired touchdown point, the pilot can fly to that point in much the same manner as he could by adjusting and monitoring actual flight path angle through the FLIGHT PATH ANGLE and POTENTIAL FLIGHT PATH ANGLE symbols, the difference being that he will not be apprised of potential changes in that touchdown point before they actually occur.

SYSTEM COMPONENTS AND OPERATION

Figure 5:
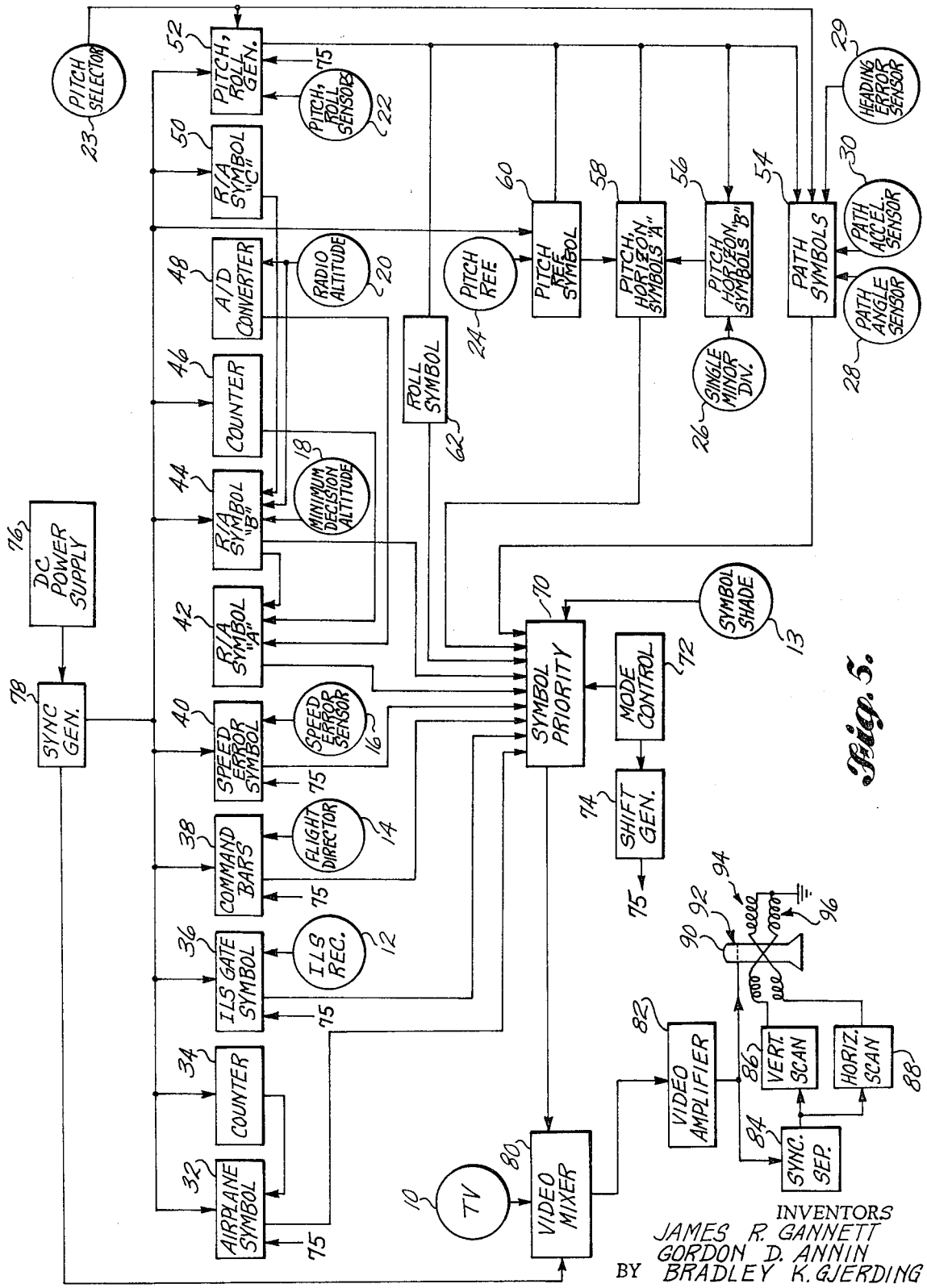
FIG. 5 is a block diagram of the system of this invention.

A complete block diagram of the system is shown in FIG. 5, and a tabulation of signal flow between the blocks in FIG. 5 is illustrated in FIG. 6. In summary, the system receives inputs from a plurality of sensors and pilot-operated controls. From these inputs, a plurality of symbol generators develop pulses which define the location, at a given instant in time, of each symbol. These plurality of pulses are then combined by suitable means which determine the relative priorities of the symbols to be displayed, so that there is no overlap, and which in addition determine which symbols are to be displayed. The outputs from this means are then combined with the real world picture, if any, and converted into a composite video output signal which corresponds to currently comprising EIA standards, including amplitude modulated synchronizing, blanking, and equalizing pulses. The composite video signal is supplied to a standard TV receiver where the synchronizing pulses are separated and supplied to horizontal and vertical sweep circuits in a standard fashion. The intensity or picture information obtained from the composite video signal is at the same time used to modulate the beam intensity of the CRT beam to produce the symbology and real world picture illustrated in FIGS. 1–4.

More specifically, the real world image is furnished by a TV camera 10 which supplies a TV signal, whose intensity represents the real world image sensed by the cathode ray tube therein, to a video mixer 80. An ILS receiver 12 supplies localizer deviation and glide slope deviation signals to an ILS GATE symbol generator 36; a flight director computer 14 supplies pitch and roll or $\theta$ and $\phi$ command signals to a command bar symbol generator 38; a speed error sensor 16 supplies a speed error signal or $\Delta V$ to a speed error symbol generator 40; and a radio altitude receiver 20 supplies an altitude or $\eta$ signal to an A/D converter circuit 48. Pitch and roll sensors 22, which may comprise commonly known gyros, supply pitch and roll signals to a pitch and roll generator 52.

A drift angle sensor 29 supplies a drift angle signal to a path symbol generator 54; a path acceleration sensor including an accelerometer supplies a path acceleration signal, or $\dot{V}$, thereto; and a path angle sensor 28 supplies a flight path angle, or $\gamma$, signal thereto.

The aforementioned sensors, with the exception of the TV camera, accelerometer, and path angle sensor, are currently supplied on most commercial aircraft. As their construction and operation are well known, they will not be discussed further.

The pilot-controlled inputs to the system are through a minimum decision altitude circuit 18, which supplies an appropriate signal to an R/A symbol generator 44; through a pitch sensitivity circuit 23, which supplies appropriate pitch sensitivity signals to pitch and roll generator 52; through a "single minor division" circuit 26 which supplies an appropriate signal denoting spacing of the minor PITCH LINE symbols, such as those occurring at ±5°, to a circuit 56, through a symbol shade circuit 13, which supplies appropriate shading signals to a symbol priority circuit 70; and through a mode control circuit 72, which supplies appropriate signals to symbol priority circuit 70 and to a shift generator 74.

The signal from circuit 18, or signal MDA, controls the altitude at which the ALTITUDE BOX symbol is flashed. The signals from circuit 23, or PS1 and PS2, determine the scaling of the PITCH LINE symbols. Finally, the signals from circuit 72 define a plurality of modes in which all or different combinations of the symbols are displayed, including a mode in which the symbols are superimposed upon a real world image as in FIG. 4.

In addition to these pilot-controlled inputs, there are a plurality of miscellaneous controls, such as the brightness and intensity controls associated with the CRT circuits, which are conventional and not illustrated.

The symbol generators and their associated circuitry engaging in FIG. 5 perform the functions of determining the location, size and configuration of the symbology in FIG. 1. Each of the symbols is constructed by combining one or more rectangular units. With some symbols, the same rectangular units are always displayed. With other symbols, rectangular units are added or removed during display. The size of each rectangular unit may vary from the entire CRT screen to a limit imposed by the resolution of the CRT modulating and scanning systems. This size is defined by two size-defining pulses produced by the appropriate symbol generator, one for the horizontal direction, and one for the vertical direction. The duration of each pulse defines the appropriate dimension of the rectangular unit, which may vary or which may be constant. In addition, each rectangular unit must be located with respect to the edges of the CRT screen in both the vertical and horizontal directions. The techniques used in the system of this invention effect such location by introducing a delay between the start of each horizontal or vertical scanning period and the start of each vertical and horizontal size-defining pulse. If the symbol is to remain fixed on the screen, this delay is constant. If the symbol is to move, this delay is varied accordingly.

Specifically, the timing of the system is under control of a sync generator 78, which is fed from a separate, regulated DC power supply 76. Generator 78 provides four output signals: sync and blanking, or BL, signals, and horizontal and vertical drive signals, HD, VD, which are supplied to the symbol generators and their associated circuitry.

The AIRPLANE symbol is generated by a circuit 32 which is under control of a separate counter circuit 34. Since the AIRPLANE symbol is fixed on the CRT screen, both with respect to location and with respect to size, the symbol is formed from a plurality of non-varying rectangles whose location and size are determined by the outputs of counter circuit 34 which in turn is stepped by the HD signal and reset by the VD signal. The output signal supplied from circuit 32 to symbol priority circuit 70 accordingly comprises a composite waveform of a plurality of delayed, size-defining pulses.

The size-defining pulses for ILS GATE symbol and PITCH COMMAND and ROLL COMMAND symbols do not vary in duration, since these symbols maintain a constant size, and thus are all generated by techniques similar to those for the AIRPLANE symbol. The location of the basic rectangular units used to define these symbols vary, and the delays of these pulses are under direct control of the output signals from the ILS receiver 12 and the flight director computer 14.

The SPEED ERROR symbol is composed of two basic rectangular units, one of which does not vary in location or in size, and one of which varies both in location and in size. The size-defining pulses for the first of these basic rectangular units is generated by the techniques used to define the ILS GATE and similar symbols. The horizontal size-defining pulses for the second of these basic rectangular units is also generated by similar techniques, but the vertical size-defining pulse has its delay and duration under direct control of the output signal from the SPEED ERROR sensor 16.

The ALTITUDE BOX symbol, like the AIRPLANE symbol, does not vary either in size or in location. The timing and duration of the size-defining pulses for this symbol is obtained from an R/A symbol "C" generator 50 and an R/A symbol "B" generator 44. The signal from generator 50 determines the delay from the start of each horizontal period to the start of each horizontal size-defining pulse. Generator 44 determines the duration of the horizontal size-defining pulse, and the location and duration of the vertical size-defining pulse.

Inputs are also provided to generator 44 from circuit 18, and from radio altitude receiver 20. Generator 44 includes a comparison means which compares the MDA signal from circuit 18 with the altitude or $\eta$ signal from receiver 20 to flash the ALTITUDE BOX symbol when the minimum decision altitude is reached.

The ALTITUDE NUMBERS symbol comprises a plurality of rectangular units which are fixed in both size and in location, and which may or may not appear, depending upon the particular altitude to be displayed. The composite output pulse defining this symbol is obtained from an R/A symbol "A" generator 42 which has inputs from the R/A symbol "B" generator 44, a counter circuit 46, and the A/D converter 48.

To this point, the elements of the system for generating non-rotating symbols have been described. The following elements are used for generating the rotating symbols of the display.

The basic element is a pitch and roll generator 52 which in effect provides horizontal and vertical composite output waveforms which modify the delay between the start of the horizontal and vertical intervals and the start of the size-defining pulses by an amount proportional to the outputs of the pitch and roll sensors 22. The composite waveforms from generator 52 are then used to control the subsequent generation of the size-defining pulses. A path symbols generator 54 produces the basic rectangular units that define the FLIGHT PATH ANGLE and POTENTIAL FLIGHT PATH ANGLE symbols. The size of each of these rectangular units is fixed. The outputs from the path angle sensor 28, the path acceleration sensor 30, and the generator 52 determine the varying delays of these size-defining pulses.

The PITCH LINE symbols, the ARTIFICIAL HORIZON symbol, the PITCH REFERENCE LINE symbol, and the SKY SHADE and GROUND SHADE symbols are generated by similar techniques by means of a pitch and horizon symbol generator "A" 58, a pitch reference symbol generator 60 which receives its input from circuit 24, and a pitch symbol and horizon generator "B" 56 which produce size-defining pulses from generator 58 whose durations are fixed but whose locations vary according to the composite waveforms from generator 52.

The ROLL MARKER symbol, which is of fixed width, is generated directly from the composite waveforms of generator 52 by means of a symbol generator 62.

The composite size-defining pulse outputs of the aforenoted circuits 32, 36, 38, 40, 42, 44, 62, 58, and 54 are supplied as inputs to the symbol priority circuit 70. To avoid overlapping of the symbols, circuit 70 establishes priorities as follows:

1. AIRPLANE and ALTITUDE NUMBERS symbols;
2. ALTITUDE BOX, PITCH COMMAND, ROLL COMMAND, SPEED ERROR, FLIGHT PATH ANGLE, and POTENTIAL FLIGHT PATH ANGLE symbols;
3. ROLL MARKER symbol;
4. ILS GATE symbol;
5. negative PITCH LINE symbols;
6. ARTIFICIAL HORIZON and positive PITCH LINE symbols;
7. real world image, SKY SHADE and GROUND SHADE.

In addition, the symbol priority circuit 70 operates under control of the signals from mode control circuits 72 to selectively blank from its output those composite pulses denoting symbols which are not to be displayed during a particular operational mode. For example, it may be desirable to display the real world picture only, or to blank the real world picture and to display certain of the symbols in FIG. 1, either singly or in combination.

The symbol priority circuit 70 has a plurality of output connections to the video mixer 80. Each of a plurality of voltage generating circuits within mixer 80 is adjusted to provide a DC voltage which corresponds to a particular modulated intensity of the CRT beam, ranging from black through the grays to white. The circuit 70 is designed to provide but one output signal at any given time on the plurality of output connections to video mixer 80. This output signal comprises the composite size-defining pulses of similar shading and highest priority present at any given time in the input signals supplied to circuit 70. Accordingly, one of the voltage generating circuits is energized to provide a DC output voltage whose intensity corresponds to the desired intensity of the CRT screen at that point in time, and thus at a particular location thereof. This DC voltage is combined with the sync and blanking, or BL, signals from generator 78 to form a standard EIA composite video signal. This signal is then supplied to a standard video amplifier 82 whose output feeds both a sync separator circuit 84 and the modulating grid of a cathode ray tube (CRT) 90. Sync separator 84 removes the horizontal and vertical synchronizing pulses from the video signal and supplies them to horizontal and vertical sweep circuits 88 and 86, respectively. These circuits in turn supply sawtooth sweep voltages to horizontal and vertical deflection means 94 and 96 associated with CRT 90. The operation of the CRT system is conventional, as the CRT face is scanned by the interlace method and the CRT beam modulated in accordance with the voltage levels supplied to grid electrode 92.

When the mode control circuit 72 is placed in an operational mode wherein the real world image is to be displayed, a logic signal is supplied to a shift generator 74 whose output signal SH is coupled to symbol generators 32, 36, 38, 40, and pitch and roll generator 52. Signal SH decreases the delay between the start of the vertical interval and the start of the vertical size-defining pulses for the rectangular units of each symbol produced by the aforenoted circuits, so that those symbols are shifted vertically to permit a larger downward field of vision for the real world image.

SYMBOL GENERATORS AND TECHNIQUES

The fixed AIRPLANE symbol comprises a plurality of basic rectangular units whose size and location does not vary during display operation, except for a shift in vertical position when a real world TV image is to be displayed. These rectangular units are defined by pulses of constant duration which are fixed in time relation to both the vertical and horizontal scanning intervals of the CRT system. More specifically, with reference to FIG. 10A, this symbol comprises a plurality of rectangular units A–E. The horizontal dimensions of these rectangular units are defined by pulses produced by a monostable multi-vibrator chain which introduces the required number of delays into the horizontal drive signal HD. The vertical dimensions of these rectangular units is determined by the outputs of the counter circuit 34 which is clocked or stepped by the horizontal signal HD and reset by the vertical signal VD.

Figures 10, 10A:
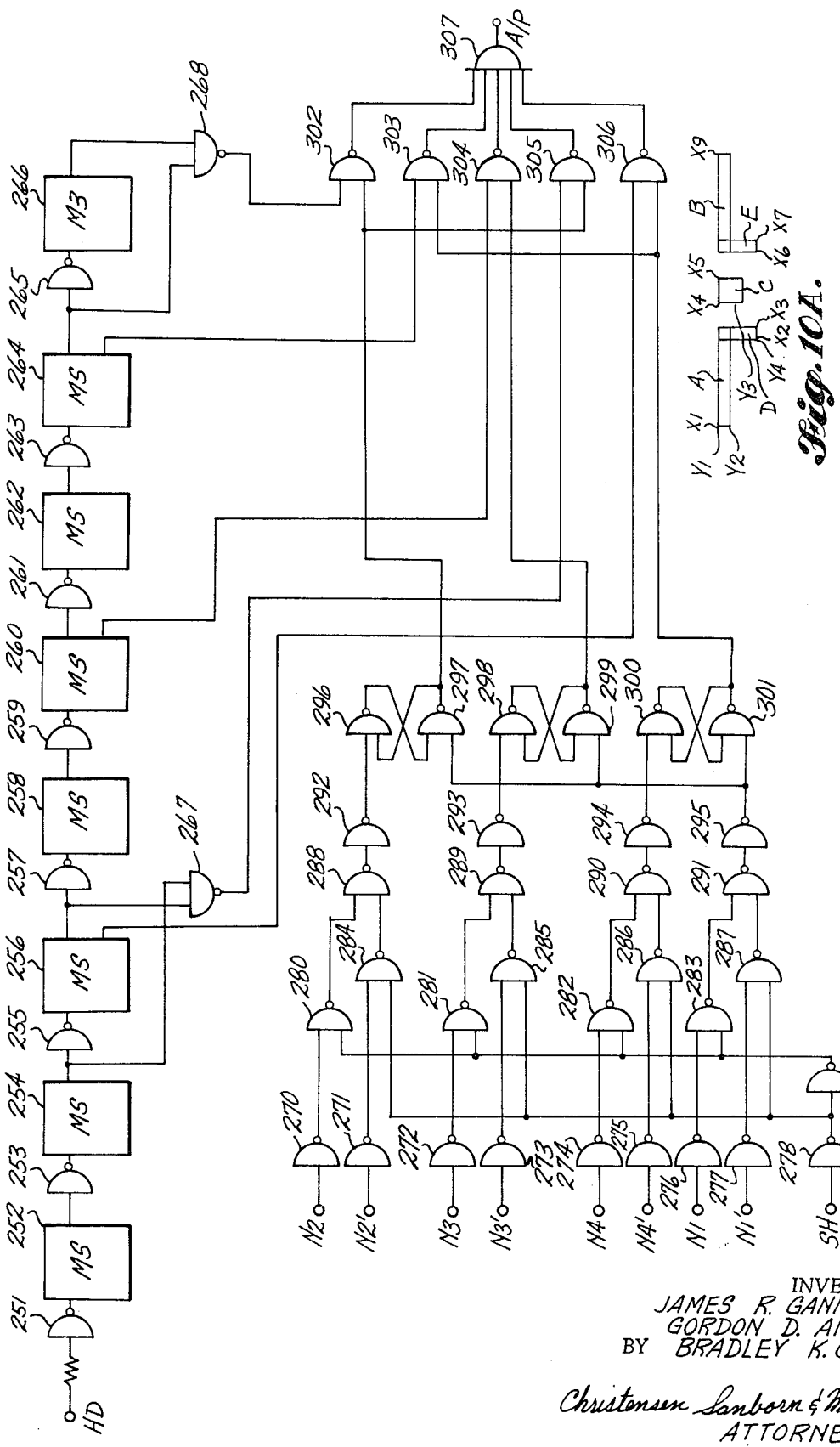
FIG. 10 is a detailed logic diagram of the airplane symbol generating circuit 32 of FIG. 5.
FIG. 10A is a pictorial representation of the basic rectangular units comprising the AIRPLANE symbol.

With particular reference now to FIG. 10, the signal HD is applied to a multi-vibrator chain comprising a plurality of NOT elements 251, 253, 255, 257, 259, 261, 263, and 265, and a plurality of monostable multi-vibrators 252, 254, 256, 258, 260, 262, 264, and 266. Monostable multi-vibrator 252 determines the horizontal location $X_1$ of rectangular unit A from the left edge of the CRT screen by appropriately delaying the HD signal. The outputs of the remaining monostable multi-vibrators define the limits $X_2$–$X_8$ in an exactly similar fashion, by delaying the inverted output of the immediately preceding multi-vibrator.

The counter circuit 34, which may be of conventional configuration, supplies a plurality of output counts $N_1$—$N_4$ and $N_1'$-$N_4'$ which define the vertical dimensions $Y_1$—$Y_4$ of the rectangular units. These output counts from counter circuit 34 are applied to a plurality of NOT elements 270—277 in FIG. 10. In order to choose which of the two sets of vertical counts is to be used and thus which of the two locations the fixed AIRPLANE symbol will occupy on the screen, the SH signal from shift generator 74 is applied via lead 75 to a NOT element 278. As previously mentioned, when mode control circuit 72 is set to superimpose symbology upon a real world image, an output is provided by shift generator 74. In the embodiment of FIG. 10, the SH signal is a logic "0" when the symbology is to be shifted to its upper position and a logic "1" when the symbology is to remain at the center position. The outputs of NOT elements 270–277 are applied in turn to a plurality of NAND gates 280, 284, 281, 285, 282, 286, 283, 287. The output of NOT element 278 is applied to gates 284–287 and through a second NOT element 279 to gates 280–283. The outputs of gates 280–287 are appropriately combined in a plurality of NAND gates 288–291.

By this arrangement, when the SH signal is a logic "0", the counts $N_1'$–$N_4'$ provide appropriately timed outputs from gate 291 and gates 288–290. When the SH signal is a logic "1", the counts $N_1$–$N_4$ provide appropriately timed outputs from gate 291 and gates 288–290.

The outputs of NAND gates 288–291 are suitably inverted by NOT elements 292–295 and applied to three RS flip-flops comprising NOT elements 296–301. In effect, each of the three RS flip-flops is set by the $N_1$ or $N_1'$ signal, to define the line $Y_1$ which extends across the fixed AIRPLANE symbol. The upper flip-flop comprising elements 296 and 297 is reset by either the $N_2$ or $N_2'$ signals to define the $Y_2$ line, and the remaining RS flip-flops are reset by the $N_3$ or $N_3'$ and $N_4$ or $N_4'$ signals to define the $Y_3$ and $Y_4$ lines, respectively. The output of the upper flip-flop is applied to NOT elements 302 and 305, that of the middle flip-flop to NOT element 304, and that of the lower flip-flop to NOT elements 306 and 303. The outputs of the second and third monostable multi-vibrators 254, 246 are applied through a NAND gate 267 to the gate 305 to define $X_1$–$X_3$ , and the outputs of the seventh and eighth monostable multi-vibrators 264, 266, are applied through a NAND gate 268 to gate 302 to define $X_6$ –$X_8$. The output of multi-vibrator 256 is applied to gate 306 to define $X_2$–$X_3$, that of multi-vibrator 260 to gate 304 to define $X_4$–$X_5$, and that of multi-vibrator 264 to gate 303 to define $X_6$–$X_7$.

The gates 302–306 form the basic rectangular units in the order B, E, C, A, D by appropriately combining the horizontal and vertical defining pulses. The outputs of gates 302–306 are combined in a single NOR gate 307 to form a composite A/P signal which is supplied to symbol priority circuit 70.

The ILS GATE symbol, as best seen in FIG. 11A, comprises a hollow rectangle whose size does not vary but whose location on the CRT screen is normally centered and varied therefrom in response to the magnitude of the localizer deviation, or LOC DEV, signal, and the glide slope deviation, or G/S DEV, signal. Simply, the delay between the start of the vertical interval and the upper edge or line U of the rectangle is varied by the G/S DEV signal, and the delay between the start of the horizontal interval and the left edge or line L of the rectangle is varied by the LOC DEV signal.

These delays are determined by the sawtooth waveforms whose voltage level is varied by the aforementioned signals. The rectangle is then generated by two monostable multi-vibrator chains which define the locations $X_1$–$X_3$ and $Y_1$–$Y_3$.

In detail, the vertical signal VD is applied through an input circuit comprising a NOT element 370 and an amplifier 371 to control the operation of an integrator which comprises an operational amplifier 374 and a capacitor 373 and transistor switch 372 in the feedback loop thereof. A reference voltage derived from the negative supply $-V_s$ is coupled to the input of operational amplifier 374. When transistor switch 372 is switched off by the VD signal, the feedback loop is completed and amplifier 374 supplies a positive-going sawtooth to the input of a summing amplifier 375. The G/S DEV signal, another reference voltage derived from $-V_s$, which determines the normally vertically-centered position of the symbol, and an offset signal are also supplied to the input of amplifier 375.

The offset signal is obtained from a circuit triggered by the SH signal from shift generator 74. The SH signal is applied through a NOT element 394 to two offset signal generating circuits, the first comprising an amplifier 395, a transistor switch 390, and a voltage generating circuit 392, and the second comprising an amplifier 396, a transistor switch 391, and a second voltage generating circuit 393. Depending on whether the SH signal is a logic "0" or a logic "1", the DC voltages produced by circuit 392 or 393 are connected to the input of amplifier 375. These voltages, and the G/S DEV voltage, modify the normally vertically centered position of the symbol by level-shifting the sawtooth waveform from amplifier 374.

The output of amplifier 375 is coupled to one input of a comparator 377 whose other input is coupled to ground potential. When the sawtooth waveform passes through ground, comparator 377 provides an output signal which is applied through a NOT element 378 to trigger a monostable multi-vibrator chain comprising monostable multi-vibrators 379, 381, and 383, and NOT elements 380 and 382. The pulse outputs of this chain, designating, respectively, the $Y_1$, $Y_2$, and $Y_3$ lines are combined in a NOT element 384.

The horizontal pulses defining the location of the line L, and thus the location on the screen of the lines $X_1$, $X_2$, and $X_3$, are produced in a similar manner, except that there is no off-set voltage introduced into the summing amplifier. The horizontal circuit comprises an integrator, summing amplifier, and monostable multi-vibrator comprising elements 350–363 which have as their inputs the horizontal signal HD, the LOC DEV signal, and a reference voltage. The three outputs of the monostable multi-vibrator chain 359, 361, 363 are supplied to a NAND gate 364 to define the locations $X_1$, $X_2$, $X_3$. The outputs of the multi-vibrators 361 and 381 in horizontal and vertical chains, as inverted by NOT elements 362 and 382, are applied to a NAND gate 385 to blank out the center of the rectangle. The outputs of gates 364, 385, and 384 are combined in a NAND gate 386 and inverted by a NOT element 387 to produce the composite ILS GATE signal which is supplied to symbol priority circuit 70.

The PITCH COMMAND symbol and the ROLL COMMAND symbol comprise a horizontally-extending rectangle and a vertically extending rectangle, respectively. The size of each rectangle in both the vertical and horizontal directions is constant. In addition, each of these rectangles can move in only one direction. For example, the location of the rectangle for the PITCH COMMAND symbol is fixed in the horizontal direction and varies only in the vertical direction, whereas the location of the rectangle for the ROLL COMMAND symbol is fixed in the vertical direction and varies only in the horizontal direction. With particular reference to FIG. 12A, the dimensions $X_1$ and $X_2$ which define horizontal position and extent of the PITCH COMMAND symbol are determined by a horizontal size-defining pulse derived from the horizontal signal HD by a monostable multi-vibrator chain. Likewise, the dimensions $Y_3$ and $Y_4$ defining the vertical position and extent of the ROLL COMMAND symbol are determined by a vertical size-defining pulse obtained from a similar multi-vibrator chain operating on the vertical signal VD.

The other dimensions of the rectangles, that is, the $Y_1$ and $Y_2$ dimensions of the PITCH COMMAND symbol and the $X_3$ and $X_4$ dimensions of the ROLL COMMAND symbol, are determined in a manner similar to the ILS GATE rectangle, by a sawtooth and comparator arrangement which varies the $Y_1$ and $X_3$ positions, respectively, according to the $\phi$ and $\theta$ CMD signals from the flight director computer 14.

In detail, the HD signal is applied through a NOT element 400 to a first monostable multi-vibrator chain comprising a multi-vibrator 401, a NOT element 402, and a multi-vibrator 403. The positions $X_1$ and $X_2$ are determined by the multi-vibrators 401 and 403, respectively. The inverted HD signal is also applied to an integrating circuit through an amplifier 420. The integrating circuit comprises an operational amplifier 423 having a reference voltage $V_s$ coupled to its input and having a capacitor 422 in its feedback loop. Capacitor 422 is shunted by a transistor switch 421 controlled by the output of amplifier 420. The output of the integrator is applied as one input to a summing amplifier 426 which also has coupled thereto a second reference voltage through a voltage divider 424. A third input to the summing amplifier 426 is provided by the $\phi$ CMD signal which is applied thereto by a potentiometer 425. The operation of this circuit is identical to the integrator and amplifier combinations of FIG. 11 so that appearing at the output of amplifier 426 is a sawtooth waveform whose level is shifted in accordance with the second reference voltage and the $\phi$ CMD signal. The symbol is normally centered by the second reference voltage, but varied from center in proportion to the sign and magnitude of the $\phi$ CMD signal.

The output of amplifier 426 is supplied as one input to a comparator 427 whose other input is supplied from ground potential. When the sawtooth waveform exceeds ground, comparator 427 produces an output signal which is coupled through a NOT element 428 to a monostable multi-vibrator 429. Accordingly, the output of multi-vibrator 429 determines the dimensions $X_3$ and $X_4$.

The vertical signal VD is coupled through a NOT element 404 to the inputs of a monostable multi-vibrator 431 and a monostable multi-vibrator 432. The output of multi-vibrator 431 is coupled to a NAND gate 433 and that of multi-vibrator 432 to a NAND gate 434. The other inputs to gates 433 and 434 are supplied from the SH signal obtained from generator 74 which is supplied to gate 433 through a first NOT element 436 and to gate 434 through an additional NOT element 437. The output of gates 433 and 434 are combined in a NAND gate 435. Depending on whether the SH signal is at a logic "1" or a logic "0" level, one of the outputs from multi-vibrators 431 or 432 is chosen to determine the dimension $Y_3$. This signal appears on the output of gate 435 and is coupled through a NOT element 438 to a monostable multi-vibrator 439 whose output determines the dimension $Y_4$.

The inverted VD signal is also supplied to an amplifier 405 which controls the operation of a second integrating circuit. This integrating circuit comprises an operational amplifier 408 having a capacitor 407 in a feedback loop thereof which is shunted by a transistor switch 406 controlled by amplifier 405. A reference voltage $-V_s$ is supplied to the input of amplifier 408, and the output thereof comprises a sawtooth waveform which is supplied through a voltage divider 409 to the input of a summing amplifier 411. Also supplied as inputs to amplifier 411 are a second reference voltage $V_s$ and the $\theta$ CMD signal through a potentiometer 410. One of two offset voltages is also supplied to amplifier 411 from a circuit comprising elements 413, 414, 441, 442, 443, and 444 which is controlled according to the logic level of the SH signal to thereby shift the position of the symbol upwards when a real world image is to be displayed.

The output of summing amplifier 411 is applied as one input to a comparator 412 whose other input is obtained from ground. As before, when the shifted sawtooth waveform reaches ground potential, comparator 412 provides an output signal which is coupled through a NOT element 415 to a monostable multi-vibrator 416. The signal at the output of multi-vibrator 416 determines the dimensions $Y_1$ and $Y_2$.

The outputs of multi-vibrators 403 and 416 are combined in a NAND gate 417 to produce a size-defining pulse representing the PITCH COMMAND symbol rectangle. Likewise, the outputs of multi-vibrators 429 and 439 are combined in a NAND gate 430 to produce a size-defining pulse representing the ROLL COMMAND symbol rectangle. The outputs of gates 417 and 430 are combined in a NAND gate 440 and the output thereof supplied to symbol priority circuit 70 as the CMD BAR signal.

With particular reference to FIG. 13A, the SPEED ERROR symbol comprises two rectangular units, one of which is fixed behind the left extension or "wing" of the AIRPLANE symbol, and the other of which varies in size and location in response to speed error. Neither the location nor the size of these rectangular units varies in the horizontal direction and therefore the dimensions $X_1$ and $X_2$ are defined by a monostable multi-vibrator chain operating on the HD signal. Since the SPEED ERROR symbol may vary either upwardly or downwardly from the AIRPLANE symbol to indicate positive and negative speed error, provision must be made to place the first rectangular unit either above or below the second rectangular unit. The circuitry in FIG. 13 accomplishes this function by setting a flip-flop on the leading edge of the first vertical size-defining pulse, whether it be of the first or second rectangular unit, and resetting that flip-flop upon the trailing edge of the other vertical size-defining pulse.

In detail, the horizontal dimensions $X_1$ and $X_2$ are determined from the HD signal by a NOT element 475, a monostable multi-vibrator 476, a NOT element 477, and a monostable multi-vibrator 478.

The VD signal is applied to an integrating circuit through a NOT element 450. The integrating circuit comprises an amplifier 451 controlling the conductive state of a transistor switch 452 which is disposed in the feedback path of an operational amplifier 454 along with a capacitor 453. A reference voltage $-V_s$ is coupled to the input of amplifier 454 and the output thereof supplied through a voltage divider network 455 to a summing amplifier 456. This output, as with the previous integrating circuits, comprises a sawtooth waveform triggered by the VD signal. A second input to amplifier 456 is a second reference voltage obtained from $V_s$ through voltage divider network 455. A third input comprises an offset signal which is obtained from an offset selection circuit controlled by the SH signal. This circuit comprises elements 457–461 and is identical to the offset selection circuits previously described.

The level-shifted sawtooth waveform appearing at the output of amplifier 456 is coupled to one input of a comparator 464 whose other input is furnished with ground potential. When the sawtooth waveform passes through ground potential, comparator 464 provides an output pulse which defines the upper vertical edge of the second rectangular unit. This pulse is coupled through a NOT element 465 to a monostable multi-vibrator 466, whose output pulse defines the vertical extent of the second rectangular unit.

The level-shifted sawtooth waveform from amplifier 456 is also supplied to a summing junction 471' which is coupled to one input of a comparator 472. Also connected to summing junction 471' is the speed error or $\Delta V$ signal which is coupled through an amplifier 471. A biasing circuit 470 is coupled to the input of amplifier 471 and serves to make the variations in $\Delta V$ symmetrical with respect to ground potential. The composite input signal presented to one input of comparator 472 is thus the level-shifted sawtooth obtained from amplifier 456 which is further shifted according to the deviation of the $\Delta V$ signal from ground potential. As the other input of comparator 472 is supplied with ground potential, an output pulse is obtained therefrom when the sawtooth waveform goes through ground potential. The output pulse from comparator 472 determines the upper vertical edge of the first rectangular unit. Whether this edge is above or below the second rectangular unit depends upon the sign of the $\Delta V$ signal. The output of the comparator is coupled through a NOT element 473 to a monostable multi-vibrator 474 whose output determines the vertical extent of the first rectangular unit.

Therefore, the outputs of multi-vibrators 474 and 466 would define on the CRT screen two distinct rectangular units of fixed size in the vertical direction and, if supplied directly to the CRT screen along with the outputs of the first monostable multivibrator chain defining the horizontal lines, would produce a symbol appearing as in FIG. 13A. To produce a single symbol, the outputs of the vertical multi-vibrators 466 and 478 are supplied to an RS flip-flop comprising NAND gates 479 and 480. Specifically, the outputs of comparators 464 and 472 are combined in a NAND gate 467 and supplied as one input to NAND gate 480, as is a cross-coupling connection from the output of NAND gate 479. The outputs of multi-vibrators 466 and 474 are also supplied as inputs to NAND gate 479, as is a cross-coupling connection from the output of NAND gate 480. By this connection, the R–S flip-flop provides a set output at the output of NAND gate 479 upon the occurrence of the leading edge of the first pulse from either the comparator 464 or 472, and is reset by the later-occurring trailing edge of the pulses from multi-vibrators 466 or 474. A single output pulse thus appears on the output of NAND gate 479 whose leading edge defines the upper vertical extent of the SPEED ERROR symbol and whose trailing edge defines the lower vertical extent of that symbol. This pulse is combined with the output of multi-vibrator 478 in a NAND gate 481, inverted by a NOT element 482, and supplied to symbol priority circuit 70 as the S/E signal.

To develop the ALTITUDE NUMBERS and ALTITUDE BOX symbols, a relatively large number of symbol generators are required because of the plurality of basic rectangular units comprising these symbols.

Figure 14:
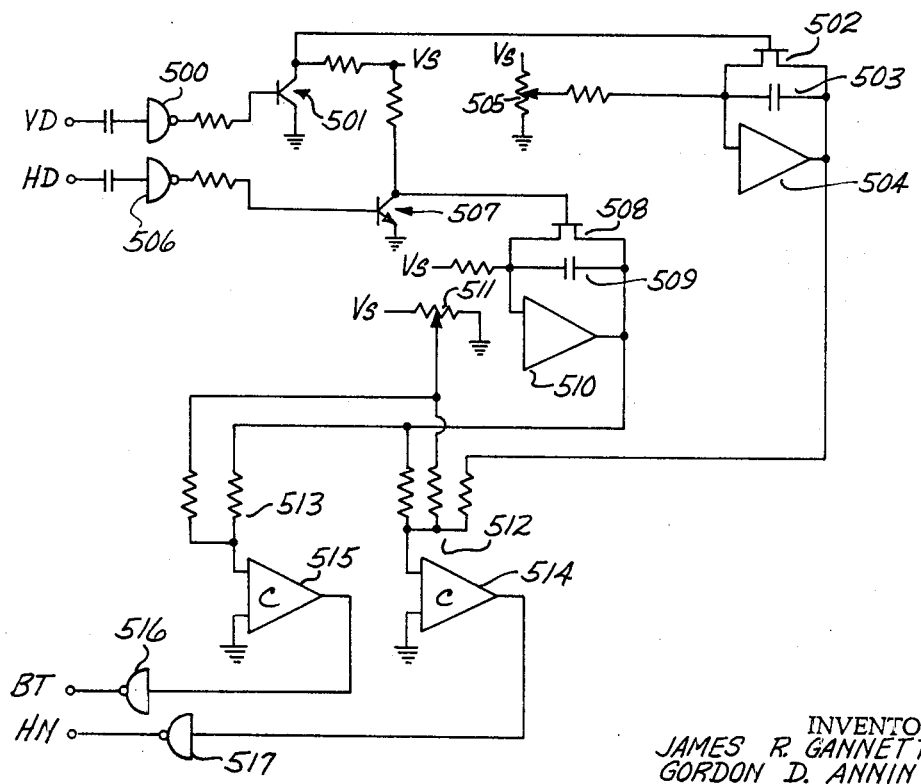
FIG. 14 is a detailed logic diagram of the R/A symbol generator "C," or element 50, of FIG. 5.

The symbol generator 50 produces two output pulses, HN and BT, which define the general location of left vertical edges of these symbols. Reference should be made to FIG. 14 taken in conjunction with the pictorial representation of the symbols in FIG. 16C. It should be noted that the left edge of the ALTITUDE NUMBERS symbol slants slightly to the right on the display. To accomplish this slant, sawtooth waveforms triggered by the HD and VD signals are combined in a comparator together with a reference voltage, whereby the output thereof occurs slightly earlier in time during each horizontal scanning interval.

In detail, the VD signal is applied to an integrating circuit through a NOT element 500 and an amplifier 501. The integrating circuit comprises an operational amplifier 504 having a capacitor 503 and a transistor switch 502 in the feedback path thereof. Switch 502 is under direct control of the output from amplifier 501. A first reference voltage is supplied to the input of amplifier 504 from $V_s$ through a potentiometer 505. The output of amplifier 504 thus comprises a sawtooth waveform triggered by the VD signal.

A horizontal sawtooth waveform is generated from the HD signal by NOT element 506, amplifier 507, transistor switch 508, capacitor 509, and operational amplifier 510.

The vertical sawtooth from amplifier 504 is applied through an input network 512 to one input of a comparator 514, as is the output of amplifier 510 having the horizontal sawtooth thereon. A second reference voltage derived from $V_s$ through a potentiometer 511 is also applied to comparator 514 through input network 512. The other input to comparator 514 is supplied with ground potential. As before, the comparator 514 provides an output pulse when the level-shifted sawtooth at its input passes through ground potential. The second reference voltage obtained from potentiometer 511 roughly determines the dimension M in FIG. 16C and the summation of the vertical sawtooth with the horizontal sawtooth at the input of comparator 514 decreases that dimension M for every succeeding horizontal line.

The horizontal sawtooth obtained from amplifier 510 is supplied along with the second reference voltage obtained from potentiometer 511 to a second comparator 515 by an input network 513. The other input to comparator 515 is supplied from ground potential. Comparator 515 provides an output pulse to roughly define the dimension N in FIG. 16C when the level-shifted sawtooth waveform at its input goes through ground potential. Unlike the dimension M, the dimension N does not vary with succeeding horizontal scanning intervals. The output of comparator 514 is converted into the HN signal by a NOT element 517, and the output of comparator 515 is converted into the BT signal by a NOT element 516. These signals are then connected to symbol generator 44.

Circuit 44 also has as inputs the altitude signal $\eta$ from circuit 20 and the pilot-controlled minimum decision altitude signal MDA from circuit 18. Circuit 44 produces two sets of output signals: the first comprises signals G, L, E, C, and A which define, respectively, the horizontal spacing of the ALTITUDE NUMBERS symbol; the second comprises the signal RAB, which defines completely the ALTITUDE BOX symbol rectangle.

The former set of outputs are produced by a monostable multi-vibrator chain operating on the variable delays between the start of the horizontal scanning intervals and the start of signal HN. The second or RAB signal is produced by two monostable multi-vibrator chains, operating, respectively, on the BT and VD signals, as modified by the MDA signal.

In detail, the HN signal is applied through a pair of NOT elements 525 and 526 to a monostable multi-vibrator 527. The output of multi-vibrator 527 is coupled through a NOT element 528 to a multi-vibrator 529. The output of multi-vibrator 527 precisely defines the M dimension, and the output of multi-vibrator 529 comprises the signal G defining the first "-vertical" leg of the ALTITUDE NUMBERS symbol, as best seen in FIG. 16C. The output of NOT element 528 also triggers a monostable multi-vibrator 530 which in turn triggers a multi-vibrator 532 through a NOT element 531 to produce the signal J defining the second "vertical" leg of the ALTITUDE NUMBERS symbol. Multi-vibrator 530 defines the dimension M–J, or H in FIG. 16C.

In a similar manner, the remaining vertical legs of the symbol are generated by elements 533–544 of FIG. 15A which produce the signals L, E, C, and A.

In FIG. 15B, the BT signal is applied through a multi-vibrator 550, a NOT element 551, and a multi-vibrator 552 to determine the horizontal positions of the ALTITUDE BOX symbol. Multi-vibrator 550 precisely defines the dimension N, and multi-vibrator 552 defines the dimension 0 in FIG. 16C.

To generate the vertical dimensions of the box, the VD signal is applied through NOT elements 553 and 554 to a monostable multi-vibrator 555 which defines the dimension P in FIG. 16C. The output of multi-vibrator 555 is applied through a NOT element 556 to a multi-vibrator 557 whose output determines the dimension Q in FIG. 16C.

As mentioned in the general discussion, the ALTITUDE BOX symbol is alternately flashed when the aircraft descends below a preset minimum decision altitude embodied in the MDA signal. Specifically, this signal has a voltage level proportional to the minimum decision altitude. Both the altitude signal $\eta$ and MDA signal are applied to opposite input terminals of a comparator 563, the $\eta$ signal through an input network 561 which makes the signal symmetrical about ground potential, and the MDA signal through an input network 562. When the magnitude of the MDA signal exceeds that of the $\eta$ signal, the comparator 563 provides an output to a NAND gate 560. Continuously supplied to the other input of NAND gate 560 is the output from a flasher circuit comprising a pair of J-K flip-flops 558 and 559 which are triggered by the VD signal applied through NOT element 554. When comparator 563 provides an output, NAND gate 560 also provides a flashing output to NAND gate 564 to which the outputs from multi-vibrators 552 and 557 having the vertical and horizontal size-defining pulses of the ALTITUDE BOX symbol are connected. The output of NAND gate 564 is inverted by NOT element 565 and supplied to priority circuit 70 as the RAB signal.

The ALTITUDE NUMBERS symbol is produced in generator 42 which has as its inputs the A, C, E, L, J, and G signals from generator 44 which define the horizontal dimensions of the basic rectangular units comprising the numerals in the symbol, signals U, V, and W from counter circuit 46, which define the vertical dimensions of the basic rectangular units therein, and the output of A/D converter 48 which is expressed in three sets of binary coded decimal numbers corresponding to the units, tens and hundreds value of the radio altitude signal $\eta$.

Counter circuit 46 is conventional and is set by the HD and VD signals to produce the three signals, U, V, W, which represent the vertical extent of the three horizontal rectangular units used to form the numerals of the symbol. The U signal denotes the extent of the upper unit, the V signal, the extent of the middle unit, and the W signal, the extent of the lower unit. The A/D converter 48 is also conventional. Each set of binary coded decimal numbers denotes a particular decimal number, for example, in the units column, the number 7 is expressed 0111, according to conventional form.

The circuitry in FIGS. 16A and 16B first defines the dimensions X, Y, HH, FF, BB, from adjacent horizontal and vertical signals in the following manner. To form the dimension X, and RS flip-flop is set upon the leading edge of the U signal and reset upon the trailing edge of the V signal. The other horizontal and vertical dimensions are formed in an identical manner. The basic rectangular units defined by the signals from counter 46 and generator 44, and the RS flip-flops in FIG. 16, are then selected by the outputs of BCD decoders operating on the three series of BCD numerals from A/D converter 48 to form three seven-segment numerals for display as the ALTITUDE NUMBERS symbol. A seven-segment display number is composed of the basic rectangles seen in FIG. 16D, wherein any decimal number can be represented by an appropriate combination of the basic rectangles. For example, the numeral 7 is formed by switching on rectangles I, II, III.

In detail, the signal A is applied to a NOT element 601, and to NAND gates 602 and 620. The signal C is applied to a NOT element 604 and to NAND gate 603 which is cross-coupled with NAND gate 602 to form an RS flip-flop. The output of NOT element 601 appearing on line 625 denotes the dimension A in FIG. 16C. The output of NOT element 604 appearing on line 627 denotes the dimension C in FIG. 16C. The RS flip-flop comprising gates 602 and 603 is set by the signal C and reset by the HD signal, and its output appears on line 626 and denotes the dimension BB in FIG. 16C.

In a similar manner, the signals E and L, and J and G are combined to form the dimensions FF and HH by elements 605–612 and 621–622. Pulses representing these dimensions appear on lines 628–633, respectively. The signal U is applied to a NOT element 619 and to a NAND gate 618. The signal V is applied to a NOT element 616, a NAND gate 624, and a NAND gate 617. Gates 617 and 618 are cross-coupled to form an RS flip-flop whose output is also coupled to NAND gate 624. The dimension U is represented by the signal appearing at the output of element 619 on line 638. the dimension B is represented by the signal appearing on the output of NOT element 616 on line 636. As with the horizontal signals, the RS The comprising gates 617 and 618 is set by the leading edge of the U signal and reset by the trailing edge of the V signal, thus producing a pulse denoting the dimension X at the output of NAND gate 624 on line 637. In addition, the V signal is used to trigger the next adjacent RS flip-flop comprising NAND gates 614 and 615 to provide the overlap noted in FIG. 16C between the X and Y dimensions. Otherwise, the V and W signals are combined in a manner exactly similar to that of the U and V signals by elements 613, 614, 615, and 623. The W dimension is represented by the output of element 613 which appears on line 634, the Y dimension by the output of gate 623 which appears on line 635.

The signals on lines 625–638 are supplied to three gating units which decode the binary coded decimal numbers into seven-segment form and appropriately generate the required segments by combination with the basic rectangular units denoted by the signals on lines 625–638. Three decoders 640, 641 and 642 are provided, each of which may comprise a commercially available Fairchild 9307 integrated circuit package. The units decoder 640 is provided with the units binary coded decimal numbers D1 from converter 48 through four NAND gates 650–653 and four NOT elements 654–657. NAND gates 650–653 are also provided with an input from the hundreds decoder 642. The units decoder 640 provides seven output signals on seven distinct lines which are connected to NAND gates 660–666. The presence of a signal on a particular line denotes a particular segment of the seven-segment representation to be displayed. The outputs of gates 660–666 define these segments by appropriately combining the horizontal and vertical size-defining pulses appearing on lines 625–638.

For example, gate 660 also has as inputs the lines 626 and 636. The pulse on line 626 is the output of the RS flip-flop defining the BB dimension and the pulse on line 636 is the output of NOT element 616 defining the V dimension. Therefore, if decoder 640 also provides an output signal to gate 660, the middle horizontally extending segment of the units numeral is displayed. Gates 661–666 function in an identical manner, and their outputs are coupled along with that of gate 660 to a NAND gate 667. Of course, decoder 640 may actuate one or more of the gates 660–666 at any one time, depending on the particular numeral to be displayed.

Tens decoder 641, with its accompanying gates 670–676, is responsive to the tens binary coded decimal numbers $D_2$ from converter 48 and hundreds decoder 642, along with its accompanying gates 680–686, is responsive to the hundreds binary coded decimal numbers $D_3$ from converter 48. The seven-segment representations of the tens and hundreds numerals are combined in NAND gates 677 and 687. The outputs of gates 667, 677 and 687 are combined in a NOR gate 690, inverted by a NOT element 692 and supplied as the RAN signal to priority circuit 70.

The hundreds decoder 642 has a blanking input 642' grounded so that when the input signal $D_3$ thereto is zero, no output is provided on any of the seven output lines 680–686. This feature is available with the aforenoted commercially-available Fairchild unit. In this manner, when the hundreds digit is zero, no symbol is displayed in the hundreds position. A second terminal 642" of decoder 642 is connected by a line 639 to the blanking input 641' of tens decoder 641. When the decoder 642 is blanked, a signal is sent on line 639 to the blanking input 641' to enable the tens decoder 641 to be blanked when the input signal $D_2$ thereto also is zero. A similar connection is made from a terminal 641" by a lead 695 to the blanking input 640' of units decoder 640. In addition, the signal at terminal 641' is coupled by a lead 693 and a NOT element 694 to input NAND gates 650–653 associated with the $D_1$ signal. In this manner, the unit digits are displayed only when the radio altitude signal $\eta$ is below 100 feet.

The remaining symbols are rotate with changes in roll attitude of the aircraft. These symbols are generated in circuits 54–62 by using the comparison of two analog voltages with a composite sawtooth waveform. Pitch and roll generator 52 generates the composite sawtooth waveforms needed to define the symbol locations and durations in the rotated directions. More specifically, generator 52 has inputs from the pitch and roll sensors 22 and from a pitch sensitivity selector 23 which is pilot-controlled. The pitch quantity comprises a single analog voltage, or $\theta$, but roll is defined by two analog voltages, one proportional to the cosine of the roll angle $\phi$, or COS $\phi$, and the other proportional to the sine of the roll angle $\phi$, or SIN $\phi$. One of the composite sawtooth waveforms defines the horizontal location and extent of the symbols and comprises two components: a sawtooth waveform triggered by the horizontal signal HD whose amplitude is proportional to COS $\phi$ and a sawtooth waveform triggered by the vertical signal VD whose amplitude is proportional to SIN $\phi$. A vertical composite sawtooth waveform which defines the location and duration of the vertical dimension of the symbols comprises the combination of a sawtooth waveform triggered by the horizontal signal HD whose amplitude is proportional to SIN $\phi$ and a sawtooth waveform triggered by the vertical signal VD whose amplitude is proportional to COS $\phi$.

For those symbols whose position varies with pitch, the level of the composite sawtooth is shifted by adding thereto the analog voltage $\theta$.

Figure 23:
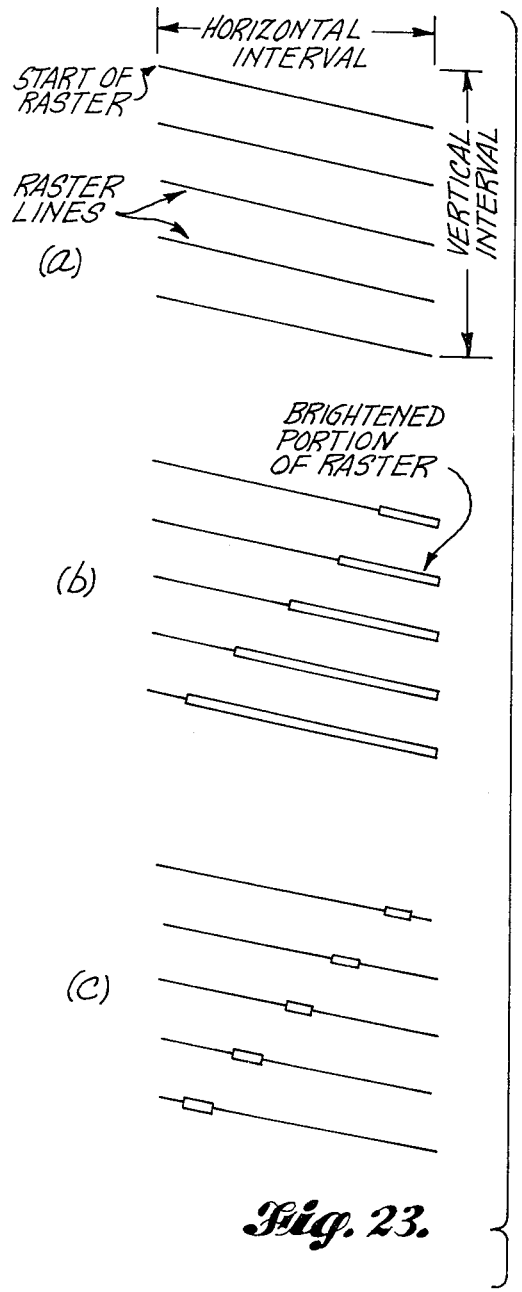
FIG. 23 is a reproduction of a CRT raster showing the generation of rotating symbols.
Figure 24:
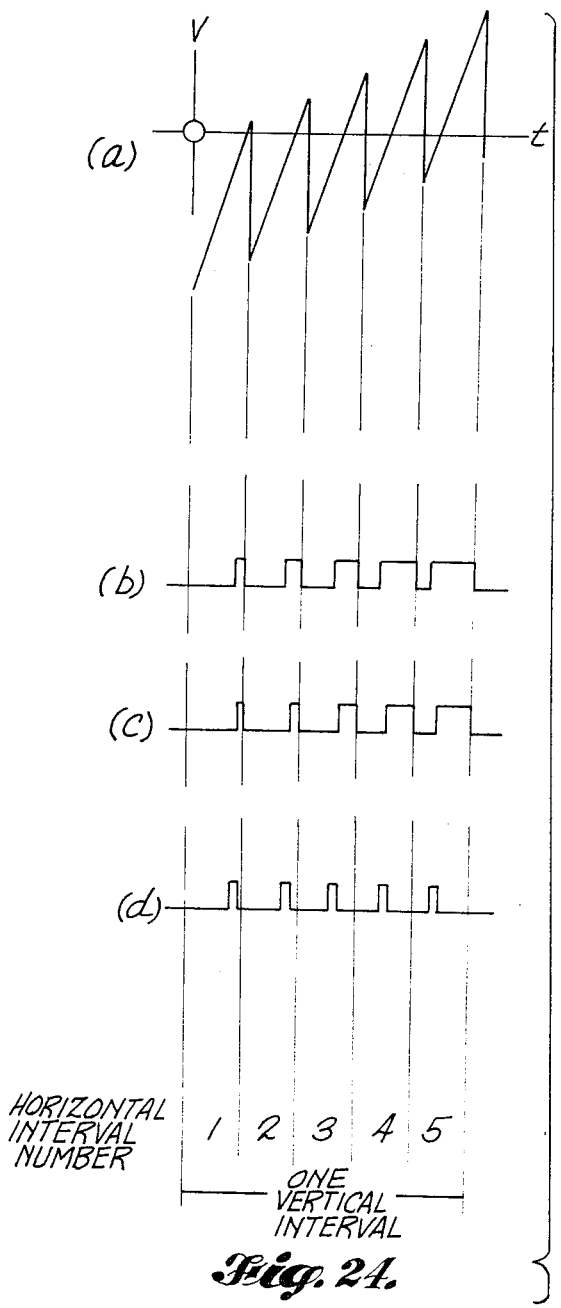
FIG. 24 is a timing diagram explaining the generation of rotating symbols.

By reference to FIGS. 23 and 24, the usage of the composite sawtooth waveforms in generating rotating symbols can be more clearly seen. For purposes of illustration, the raster defining the CRT image is assumed to comprise five horizontal lines, and the raster is traced as seen in FIG. 23($a$), starting at the upper left-hand corner thereof and proceeding from left to right. It is also assumed that the horizontal scanning interval occurs through the scanning of the entire CRT screen, and that each vertical scanning interval equals five horizontal scanning intervals. To produce a diagonal line at 45°, a "-horizontal" composite sawtooth waveform is formed by combining vertical and horizontal synchronized sawtooth waveforms whose amplitude is dependent on the SIN $\phi$ and COS $\phi$ signals. Since at 45° these signals are equal in magnitude, the outputs of the vertical and horizontal synchronized sawtooth waveform generators are equal, and their summation into a composite sawtooth waveform appears as in FIG. 24($a$). If the waveform in FIG. 24($a$) is fed to a comparator whose other input is provided with ground potential, the output of the comparator appears as in FIG. 24($b$). It should be noted that the leading edge of the output pulse from the comparator appears slightly earlier during each horizontal scanning interval. If the signal in FIG. 24($b$) is used to modulate the grid of the CRT, the display on the screen thereof appears as in FIG. 23($b$), in which it can be noted that the leading edge of the brightened portion of the raster extends at an angle of 45°.

If the composite waveform in FIG. 24($a$) is fed to a second comparator which has its second input a slightly positive voltage, the second comparator produces an output waveform as illustrated in FIG. 24($c$). It can be noted that although the leading edge of the pulses in FIG. 24($c$) occurs slightly earlier during each succeeding horizontal scanning interval, that their time occurrence lags that of the leading edges of the pulses in FIG. 24($b$). When the waveforms in FIG. 24($b$) and FIG. 24($c$) are combined, a waveform such as illustrated in FIG. 24($d$) results which comprises a plurality of pulses of equal duration which occur earlier during each horizontal scanning interval. When pulses such as in FIG. 24 ($d$) are used to modulate the CRT beam, a display such as in FIG. 23($c$) results, in which the desired 45° line is traced. The width of each line trace is constant and is directly proportional to the difference between the reference voltages set into the comparators.

In a similar manner, the vertical location and extent of any display symbol may be similarly generated by a "vertical" composite sawtooth waveform.

Figure 17:
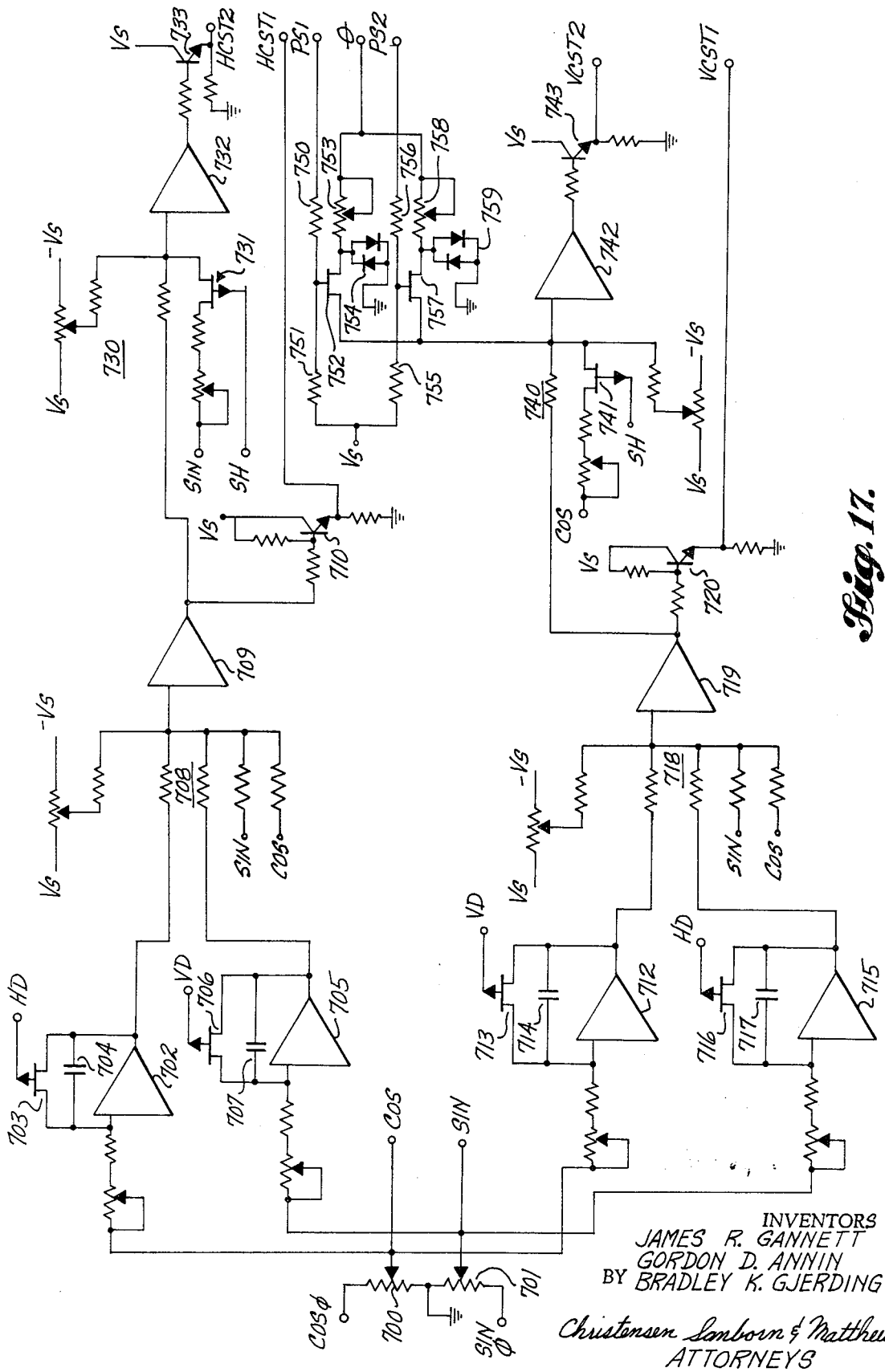
FIG. 17 is a detailed logic diagram of the pitch and roll generator 52 of FIG. 5.
Figure 18:
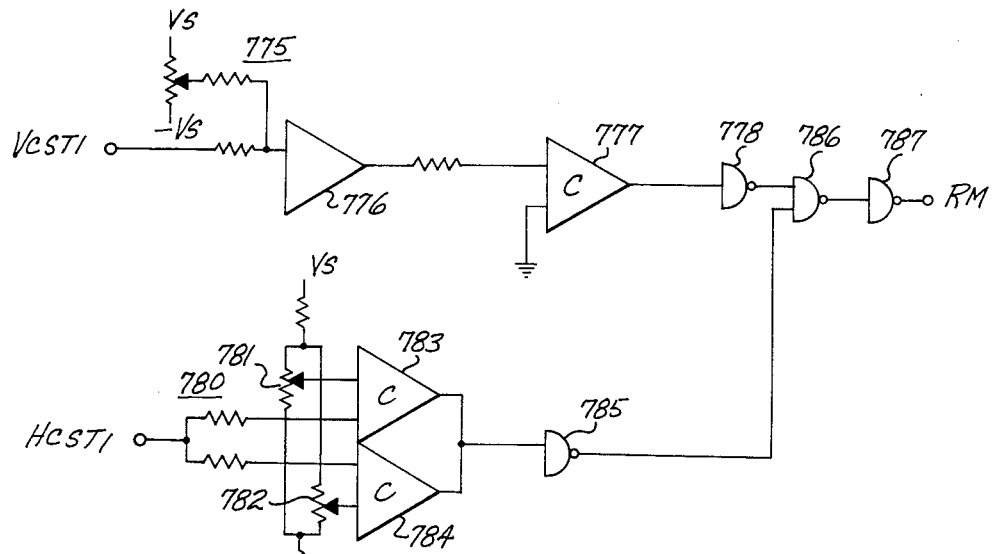
FIG. 18 is a detailed logic diagram of the roll symbol generating circuit 62 of FIG. 5.
Figure 19:
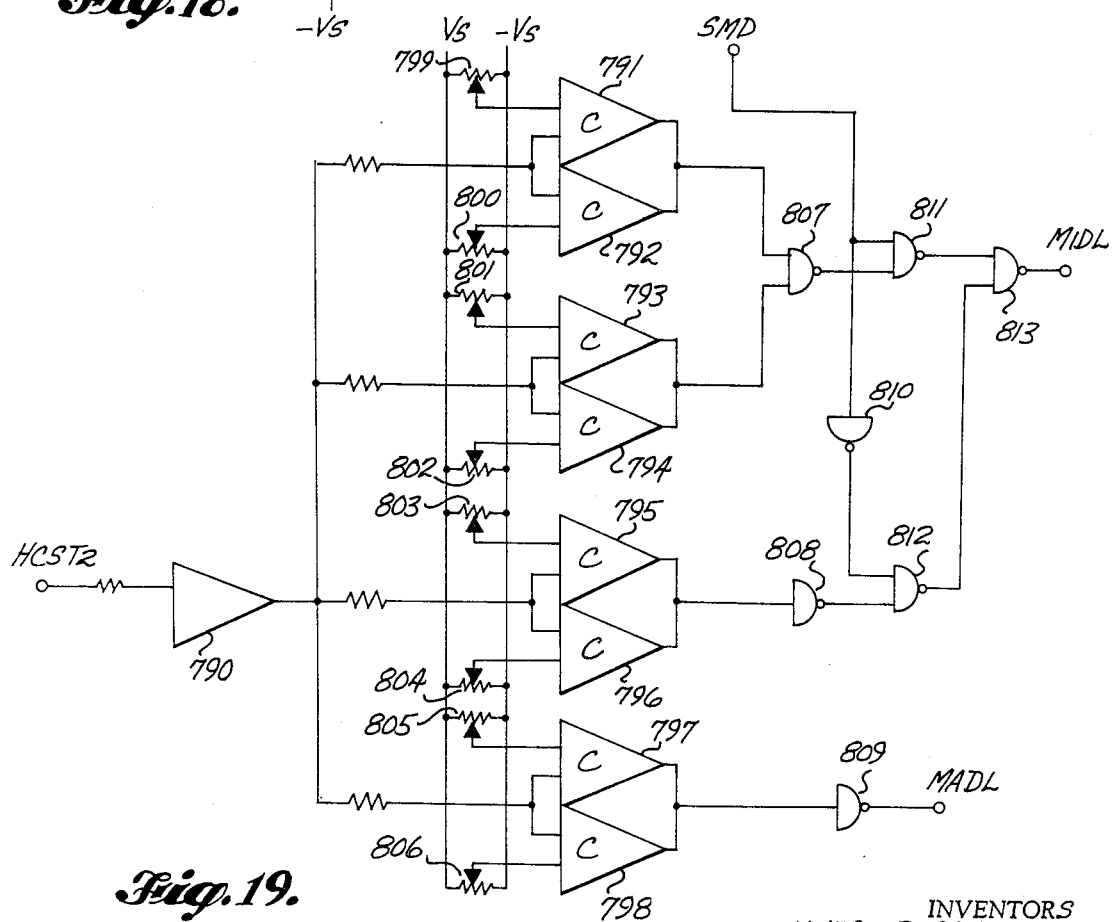
FIG. 19 is a detailed logic diagram of the pitch and horizon symbols generator "B," or element 56, of FIG. 5.

In detail, the pitch and roll generator for producing the composite sawtooth waveforms is illustrated in FIG. 17. The COS $\phi$ and SIN $\phi$ signals are applied to two potentiometers 700 and 701, respectively, upon whose taps appear signals denoted COS and SIN, respectively. The COS signal is applied to a first and second integrating circuits, controlled, respectively, by the HD and VD signals. The first integrating circuit comprises an operational amplifier 702 whose integration cycle is controlled by a transistor switch 703 shunting a capacitor 704 in the feedback loop thereof. Similarly, the second integrating circuit comprises an operational amplifier 712 whose integration cycle is controlled by the VD signal applied to a transistor switch 713 shunting a capacitor 714 in the feedback loop thereof. The SIN signal is applied to third and fourth integrating circuits whose integrating cycles are controlled, respectively, by the VD and HD signals and which comprise elements 705, 706, 707, 715, 716, and 717. The outputs of the first and third integrating circuits are coupled through an input network 708 to a summing amplifier 709, and the outputs of the second and fourth integrating circuits are coupled through an input network 718 to a summing amplifier 719. Also coupled to amplifiers 709 and 719 through networks 708 and 728 are biasing voltages derived from the voltage supply $V_s$. Finally, the SIN and COS signals are also directly coupled to amplifiers 709 and 719 to compensate for nonlinearities in the integrating circuits previously described.

The output of summing amplifier 709 represents a "-horizontal composite sawtooth waveform" which is used to define the "horizontal" extent of the rotated symbols. This output is coupled through an emitter-follower amplifier 710 to appear as signal HCST1, and is also coupled through an input network 730 to a summing amplifier 732 which has one input thereto a biasing voltage developed from the supply voltage $V_s$. The transistor switch 731 is controlled by the SH signal to connect the SIN signal to the input of amplifier 732. Although not detailed here, the mathematics of coordinate transformation dictate that in order to shift the "horizontal" extent of the rotated symbols in an upward direction when a real world image is to be displayed, a quantity equal to the sine of the roll angle $\phi$ must be added to the horizontal composite sawtooth waveform. Therefore, appearing on the output of amplifier 732 is a signal which comprises the horizontal composite sawtooth waveform, as modified for two different display modes. This output is coupled through an emitter-follower amplifier 733 to appear as signal HCST2.

The output of summing amplifier 719 represents a "vertical composite sawtooth waveform" which is used to define the "vertical" extent of the rotated symbols. This output is coupled through an emitter-follower amplifier 720 to appear as signal VCST1, and is also coupled through an input network 740 to a summing amplifier 742. A second input to amplifier 742 comprises a biasing voltage obtained from the supply voltage $V_s$. In addition, a transistor switch 741 controlled by the SH signal connects a third input, the COS signal, thereto. Finally, a pitch signal developed from the $\theta$ signal under control of pitch sensitivity signals PS1 or PS2 is also coupled to the input of amplifier 742.

The voltage supply $V_s$ is coupled to the PS1 signal by resistors 750 and 751 and to the PS2 signal by resistors 755 and 756. The common point of resistors 750 and 751 is connected to the control electrode of a transistor switch 752, and the common point of resistors 755 and 756 is coupled to the control electrode of a transistor switch 757. Switch 752 is connected in circuit with the input network 740 and with the $\theta$ signal through a variable resistor 753. Switch 757 is connected in circuit with the input network 740 and with the $\theta$ signal through a variable resistor 758. Diode networks 754 and 759 bias switches 752 and 757 at ground potential.

As with the horizontal composite sawtooth waveform, the mathematics of coordinate transformation dictate that a quantity equal to the cosine of the roll angle $\theta$ be added to the vertical composite sawtooth waveform to enable the upward shifting of the "vertical" extent of the rotated symbols.

Depending on which of the PS1 of PS2 signals is a logic "0," switch 752 or 757 is actuated, thereby coupling the $\theta$ signal to the input of summing amplifier 742. Accordingly, two adjustable choices of pitch sensitivity are provided by variable resistors 753 and 756.

Therefore, appearing on the output of amplifier is a signal which comprises the vertical composite sawtooth waveform, as modified for two different display modes, and as further modified for pitch attitude. This output is coupled through emitter-follower amplifier 743 to appear as signal VCST2.

To summarize, the HCST1 and VCST1 signals represent the horizontal and vertical composite sawtooth waveforms, respectively, used to define the "horizontal" and "vertical" location and extent of the rotating symbology. The HCST2 signal is a modified HCST1 signal which allows the "horizontal" definition of the rotated symbols to be shifted upwardly under appropriate conditions. The VCST2 signal is a modified VCST1 signal which allows the "vertical" definition of the rotated symbols to be shifted upwardly and which provides for vertical displacement of the rotated symbols according to changes in pitch attitude.

The ROLL MARKER symbol is generated by a technique similar to that discussed with respect to FIGS. 23 and 24, except that the vertical extent of the symbols is limited. In detail, the HCST1 signal is applied by an input network 780 to the opposing inputs of dual comparators 783 and 784. The other inputs to these comparators are supplied with reference voltages developed from the taps of potentiometers 781 and 782 connected in parallel between $V_s$ and $-V_s$. The reference voltage at the tap of potentiometer 782 determines the left edge of the symbol, and the voltage at the tap of potentiometer 781 determines the right edge of the symbol. By connecting the outputs of comparators 783 and 784 in opposition, a single output signal is provided to a NOT element 785 when the sawtooth waveform at comparator 784 exceeds the reference potential supplied thereto, and is removed therefrom when the sawtooth waveform to comparator 783 exceeds the reference voltage supplied thereto.

The VCST1 signal is supplied to the input of a buffer amplifier 776 as is a reference voltage through an input network 775. The reference voltage level shifts the vertical composite sawtooth VCST1 to accordingly define the lower edge of the ROLL MARKER symbol. The output of amplifier 776 is compared with ground potential in a comparator 777. When the sawtooth passes through ground potential, comparator 777 provides an output pulse which is coupled to a NOT element 778. The outputs of NOT elements 778 and 785 are combined in a NAND gate 786 so that the output pulse thereof accordingly defines the left edge, right edge, and lower edge of the ROLL MARKER symbol. This output is inverted by a NOT element 787 and supplied to priority circuit 70 as the RM signal.

The horizontal pitch symbols generator 56 defines the rotated "width" of the PITCH LINE symbols As noted in FIG. 1, the major pitch lines extend across the CRT screen whereas the minor pitch lines occupy but a small portion thereof. In a mode of operation where the PITCH COMMAND and ROLL COMMAND symbols are not displayed, the minor pitch lines are centered on the CRT screen; in a mode of operation where the PITCH COMMAND and ROLL COMMAND symbols are displayed, the minor pitch lines are split into pairs on either side thereof.

In detail, the HCST2 signal is applied through an input amplifier 790 to the inputs of dual comparators 791 and 792, 793 and 794, 795 and 796, and 797 and 798. The inputs of each pair of comparators are connected in opposition and the outputs are connected together so that an output signal is produced thereon when one comparator produces an output pulse and is removed when the other comparator also produces an output pulse. Reference voltages are set into each of comparators 791–798 by a plurality of potentiometers 799–806 operating on the supply voltages $V_s$ and $-V_s$. The taps of potentiometers 805 and 806 are set to position the right and left edges of the major pitch lines, such as the +10° PITCH LINE symbol in FIG. 1. The taps of potentiometers 803 and 804 are set to position the right and left edges, respectively, of the minor pitch lines when those lines are to be centered. The taps of potentiometers 799–802 are set to position the horizontal edges of the minor pitch lines when those lines are to be displayed in pairs.

The output of comparators 797 and 798 is inverted by a NOT element 809 and supplied to generator 58 as the MADL signal. The output of comparators 795 and 796 is inverted by a NOT element 808 and supplied to one input of a NAND gate 812. Likewise, the outputs of comparators 791, 792, and 793 and 794 are combined in a NAND gate 807 and supplied to one input terminal of a NAND gate 811. Gates 811 and 812 are under control of the SMD signal, which is produced when the minor PITCH LINE symbols are to be centered. Accordingly, the SMD signal is coupled to the other input of NAND gate 811, and the other input of NAND gate 812 by a NOT element 810. The outputs of gates 811 and 812 are combined in a NAND gate 813 and supplied to generator 58 as the MIDL signal. Depending on the logic state of the SMD signal, only one of gates 811 or 812 is energized at any one time.

The pitch and horizon symbols generator 58 defines the vertical location and extent of the rotating symbols. Basically, generator 58 operates on the VCST2 signal with a plurality of dual comparators having two reference voltages coupled thereto, the first defining the location of the symbol, and the second its "vertical" extent.

In detail, the VCST2 signal is applied via a lead 825 to the inputs of a plurality of summing amplifiers 840—848. Also supplied to the inputs of amplifiers 841–844 are a corresponding plurality of reference voltages obtained from the tap of a potentiometer 831 by a lead 829 and variable resistances 841'–844'. In a similar manner, the inputs of amplifiers 845–848 are also supplied with reference voltages obtained from a potentiometer 832 by a lead 834 and variable resistances 845'–848'.

Figure 20A:
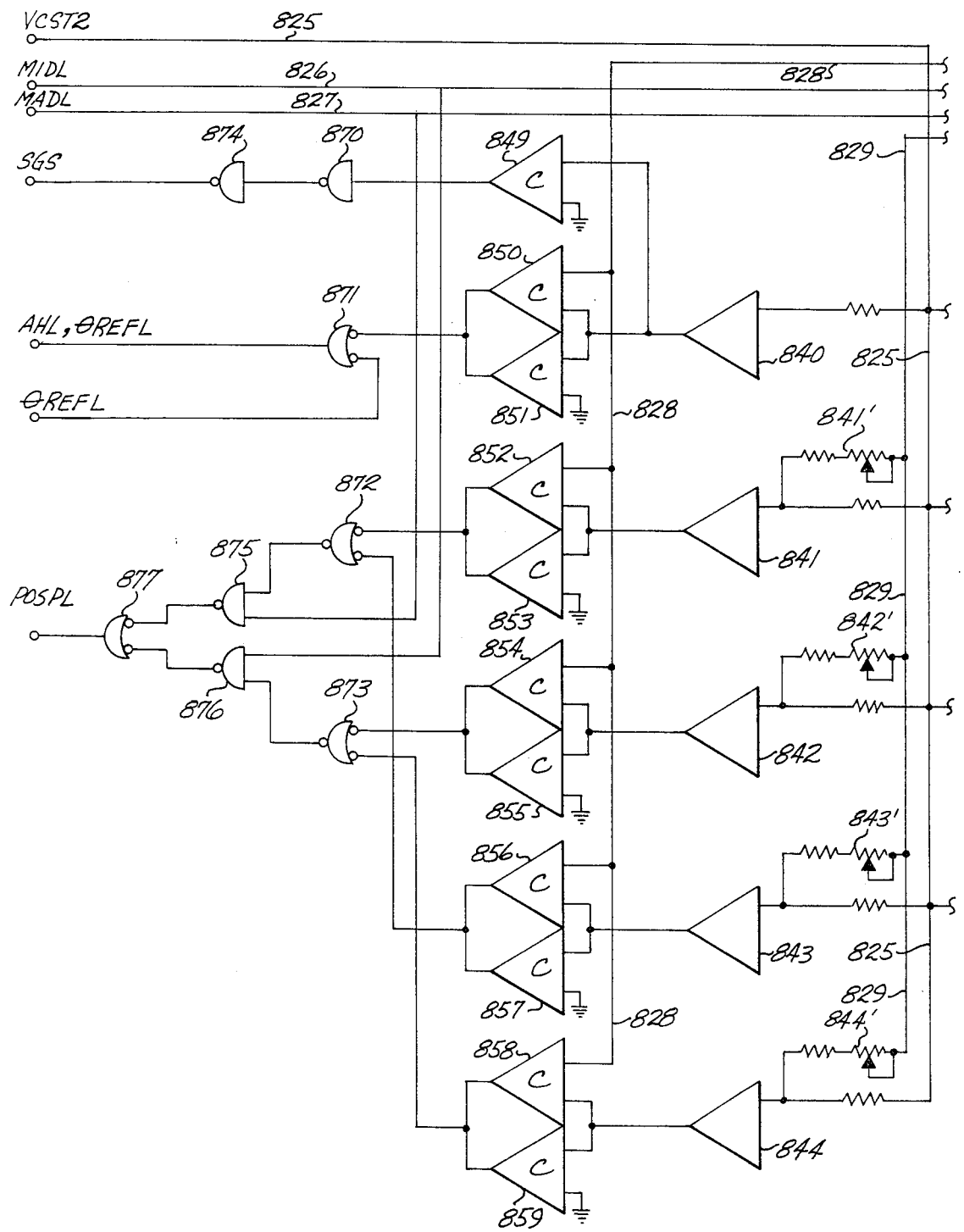
FIGS. 20A and 20B are detailed logic diagrams of the pitch and horizon symbols generator "A," or element 58, of FIG. 5.
Figure 20B:
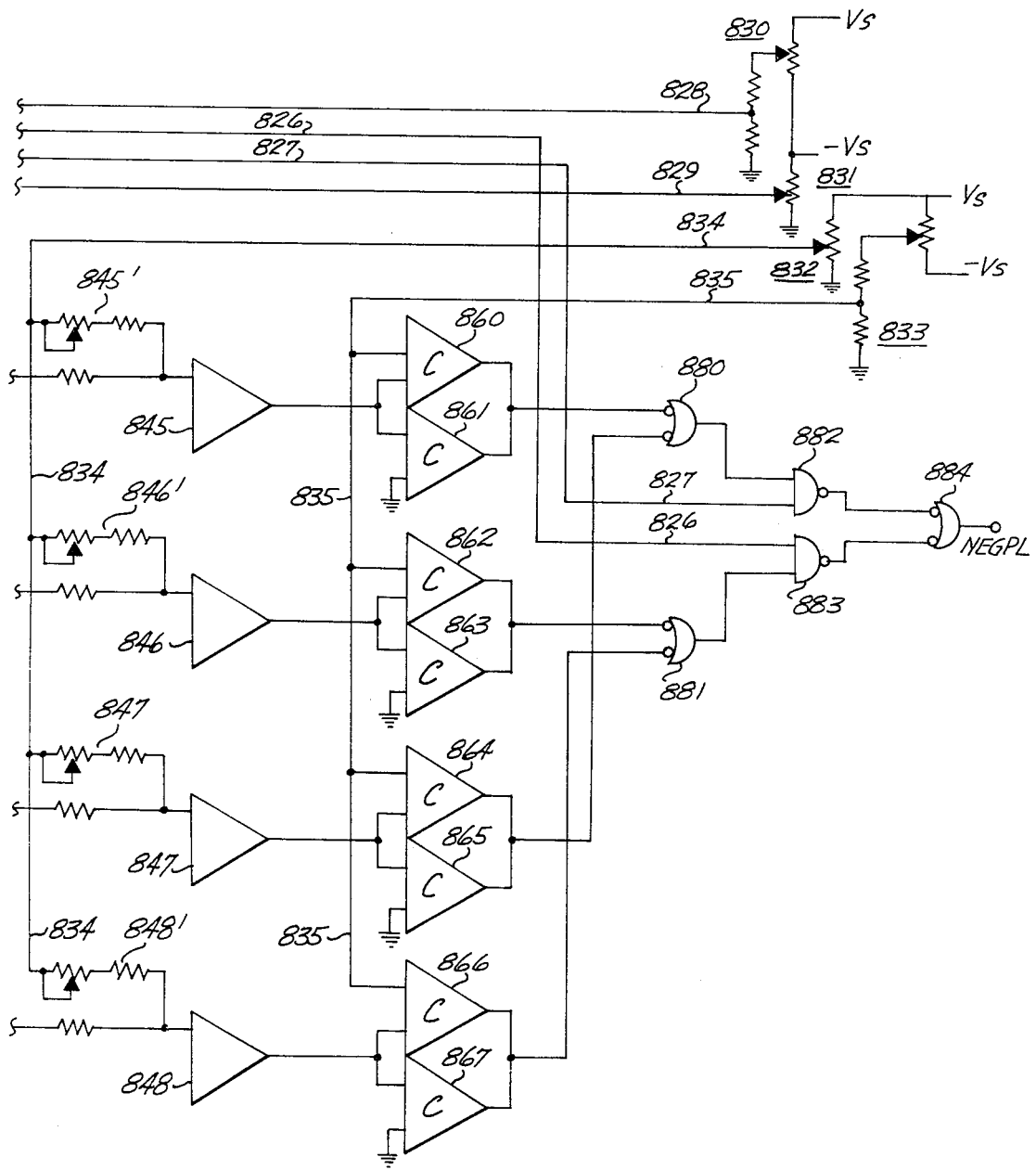

The voltage on the tap of potentiometer 831 determines the general location of the ARTIFICIAL HORIZON symbol by level-shifting the composite sawtooth waveform VCST2. The location of the positive PITCH LINE symbols is determined by the setting of variable resistances 841'-844'. In the embodiment illustrated in FIG. 20A, variable resistances 841'-844' are set to position the +5°, +10°, +15° and +20° PITCH LINE symbols.

In a like manner, the voltage on the tap of potentiometer 832 determines the general location of the negative PITCH LINE symbols, and the setting of variable resistances 845'-848' determines the location of the −20°, −15°, −10° and −5° PITCH LINE symbols.

The output of amplifier 840 is connected to one input of a comparator 849 and to opposing inputs of dual comparators 850 and 851. Likewise, the outputs of amplifiers 841-843 are connected to opposing inputs of dual comparators 852 and 853, 854 and 855, 856 and 857, and 858 and 859. The other inputs of comparators 849, 851, 853, 855, 857 and 859 are provided with ground potential. Accordingly, these comparators define the upper or top edge of the symbol generated thereby. The other inputs of comparators 850, 852, 854, 856 and 858 are provided with a single reference voltage which is obtained from the tap of a potentiometer 830 by a lead 828. This single reference voltage 830 determines the lower or bottom edge of the symbol generated by these comparators. To summarize, the output of comparator 849 defines the separation between the SKY SHADE and GROUND SHADE symbols, the output of comparators 850 and 851 defines the vertical position and extent of the ARTIFICIAL HORIZON symbol, and the outputs of comparators 852-859 define the vertical positions and extents of the positive PITCH LINE symbols.

The outputs of amplifiers 845—848 are connected to opposing inputs of dual comparators 860 and 861, 862 and 863, 864 and 865, and 866 and 867. Ground potential is supplied to the other inputs of comparators 861, 863, 865 and 867. The other inputs of comparators 860, 862, 864 and 866 are provided with a reference potential which is obtained from the tap of a potentiometer 833 by a lead 835.

Comparators 861, 863, 865 and 867 define the upper or top edges of the negative PITCH LINE symbols. The tap setting of potentiometer 833 determines the location of the lower or bottom edges of those symbols, and thus the occurrence of output signals and the outputs of comparators 860, 862, 864 and 866 denotes the vertical position and extent of the negative PITCH LINE symbols.

To completely define the rotating symbols, the comparator outputs are combined with the MIDL signal or the MADL signal. Specifically, the outputs of comparators 852 and 853, and 856 and 857, which represent the major positive pitch lines, are first combined in a NOR gate 872 whose output is connected to one input of a NAND gate 875. The other input to NAND gate 875 is furnished with the MADL signal via lead 827.

The outputs of comparators 854 and 855, and 858 and 859, which represent the minor positive pitch lines, are first combined in a NOR gate 873 whose output is supplied to one input of a NAND gate 876. The other input of NAND gate 876 is supplied with the MIDL signal via a lead 826. The outputs of gates 875 and 876 are combined in a NOR gate 877 and supplied to the symbol priority circuit 70 as the POSPL signal.

The outputs of the remaining comparators 860–867 are combined with the MIDL and MADL signals in NOR gates 880, 881, and 884, and NAND gates 882 and 883 and supplied to symbol priority circuit 70 as the NEGPL signal.

As discussed previously, the output of comparator 849 defines the demarcation between the SKY SHADE and GROUND SHADE symbols and is supplied to circuit 70 as the SGS signal after being suitably inverted by a pair of NOT elements 870 and 874. The output of dual comparators 850 and 851 is combined in a NOR gate 871 with the θREFL signal from circuit 60, hereinafter to be described, and supplied to the symbol priority circuit 70 as the AHL and θREFL signals.

The FLIGHT PATH ANGLE symbol and the POTENTIAL FLIGHT PATH ANGLE symbol are generated by techniques identical to those used to generate the ARTIFICIAL HORIZON symbol and the PITCH LINE symbols.

In detail, the VCST2 signal is applied to the input of a summing amplifier 901, as is a reference voltage obtained from the tap of a potentiometer 900. The tap setting of potentiometer 900 determines the general vertical location of the flight path symbols. The flight path angle signal γ is also connected to the input of amplifier 901, by one of two sensitivity-selecting circuits. These circuits comprise dropping resistors 910, 911 and transistor switches 916, 917 which are under control of the PS1 or PS2 signals as applied through a voltage divider network 922. Depending on which of these signals is present, the appropriate switch 916 or 917 is actuated to connect the signal γ to the input of amplifier 901 through an appropriate dropping resistor. The output of amplifier 901 thus comprises the vertical composite sawtooth waveform, as modified for pitch, or VCST2, and as further modified for flight path angle γ. The output of amplifier 901 is applied to the opposing inputs of dual comparators 932 and 933.

The HCST2 signal is applied to the input of a summing amplifier 926 which also receives a reference voltage from the tap of a potentiometer 924. The tap setting of potentiometer 924 determines the general horizontal location of the flight path symbols. A third input to amplifier 926 is provided by the DA signal, as applied through either of two sensitivity-selective circuits comprising dropping resistors 914, 915, and transistor switches 920, 921 which operate under control of the PS1 and PS2 signals. The output of amplifier 926 comprises the horizontal composite sawtooth waveform, as further modified for drift angle, and is applied to the opposing inputs of dual comparators 927 and 928, and to the opposing inputs of dual comparators 938 and 939. The other inputs of comparators 927 and 928 are provided with reference voltages from the taps of potentiometers 929 and 930, respectively, and the other inputs of comparators 939 and 938 are supplied with reference voltages from the taps of potentiometers 940 and 941, respectively. The reference voltage on the tap of potentiometer 930 determines the position of the left edge of the POTENTIAL FLIGHT PATH ANGLE symbol, and that from potentiometer 929 the right edge thereof. The reference voltage on the tap of potentiometer 941 determines the position of the left edge of the FLIGHT PATH ANGLE symbol, and that from potentiometer 940 the right edge thereof.

The POTENTIAL FLIGHT PATH ANGLE symbol is a convenient way of expressing excess or inadequate thrust of the aircraft relative to flight path angle. The information indicated by the symbol is defined to be the sum of acceleration along the flight path V, as divided by the acceleration of gravity g, and the flight path angle γ. To reference the symbol display to the ARTIFICIAL HORIZON symbol as in FIG. 1, the POTENTIAL FLIGHT PATH ANGLE symbol or Pγ, must be constructed as follows:

$$P\gamma = \theta - \gamma - K\left(\frac{\dot{V}}{g}\right)$$

Figure 21:
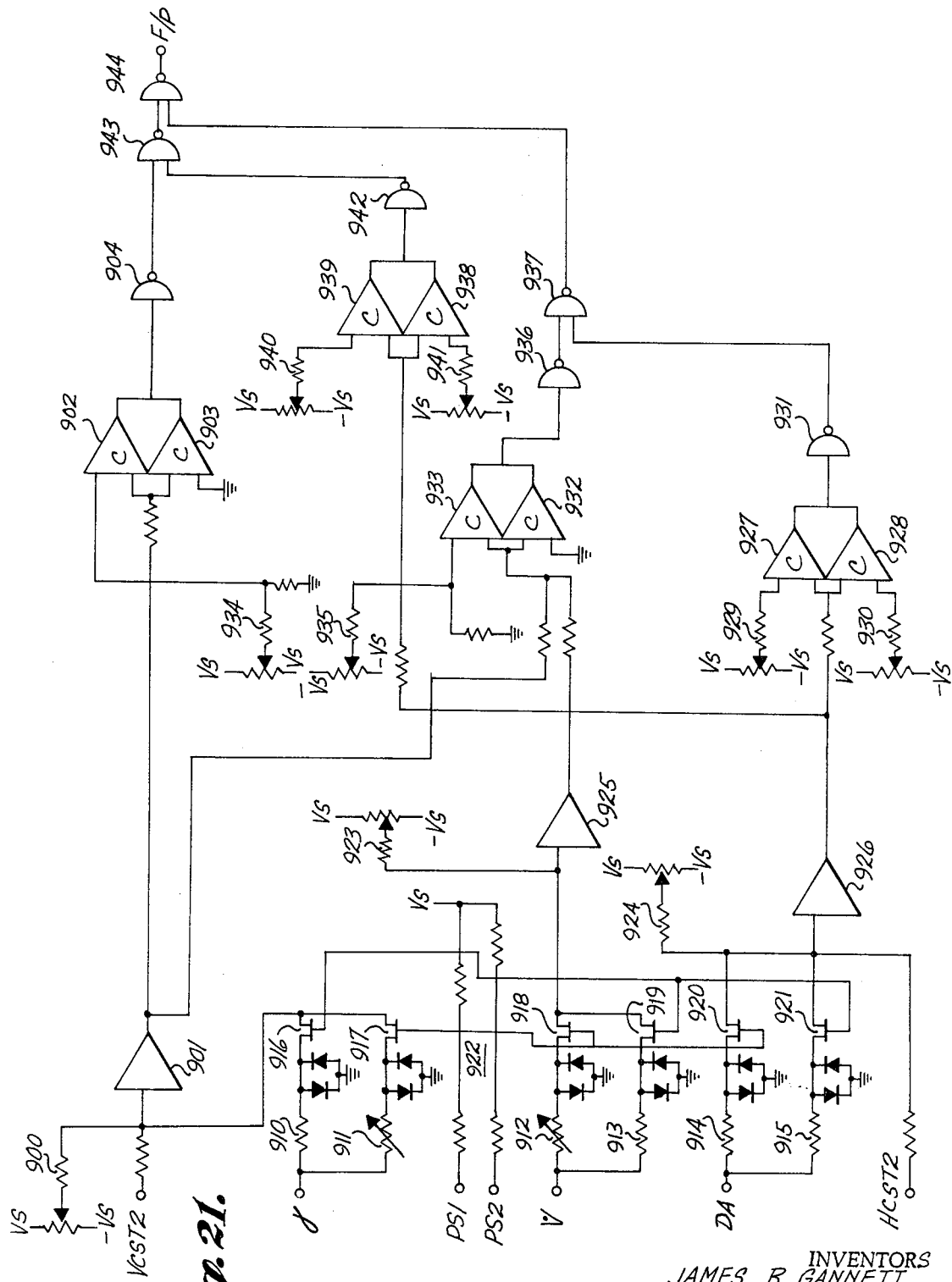
FIG. 21 is a detailed logic diagram of the path symbols generating circuit 54 of FIG. 5.

In the embodiment of FIG. 21, the quantity θ is obtained from the VCST2 signal, the quantity γ from the γ signal, the quantity $\dot{V}$ from the $\dot{V}$ signal, and the quantity K/g from a reference voltage. In this manner, excursions of the POTENTIAL FLIGHT PATH ANGLE symbol above the ARTIFICIAL HORIZON symbol indicate positive potential flight path angles. In addition, excursions of the POTENTIAL FLIGHT PATH ANGLE symbol above the FLIGHT PATH ANGLE symbol indicate an excessive amount of thrust, whereas excursions of the POTENTIAL FLIGHT PATH ANGLE symbol below the FLIGHT PATH ANGLE symbol denote an inadequate amount of thrust.

The signal $\dot{V}$ is applied to the input of an amplifier 925 by either of two sensitivity-selecting circuits comprising dropping resistors 912, 913, and transistor switches 918, 919 which operate under control of the PS1 or PS2 signals, as applied through the voltage divider network 922. Also supplied to the input of amplifier 925 is a reference voltage from the tap of potentiometer 923 whose setting determines the scaling constant K/g. The output of amplifier 925 is supplied to the opposing inputs of dual comparators 932 and 933. The other input of comparator 932 is provided with ground potential, and the other input of comparator 933 is provided with a reference potential from the tap of a potentiometer 935. A pulse appearing on the output of comparator 932 determines the upper edge of the POTENTIAL FLIGHT PATH ANGLE symbol, and a pulse appearing on the output of comparator 933 the lower edge thereof.

The output of amplifier 901 is also applied to the opposing inputs of dual comparators 902 and 903. The other input of comparator 903 is provided with ground potential, and the other input of comparator 902 with a reference voltage obtained from the tap of a potentiometer 934. A pulse appearing on the output of comparator 903 determines the upper edge of the FLIGHT PATH ANGLE symbol, and a pulse appearing on the output of comparator 902 the lower edge thereof. The outputs of these four sets of dual comparators are inverted by NOT elements 904, 942, 936 and 931. A NAND gate 943 combines the outputs of NOT elements 904 and 932, and a NAND gate 987 combines the outputs of NOT elements 936 and 931. The size-defining pulse on the output of NAND gate 943 defines the FLIGHT PATH ANGLE symbol, and the size-defining pulse on the output of NAND gate 937 defines the POTENTIAL FLIGHT PATH ANGLE symbol. These pulses are combined in a NAND gate 944 and supplied to symbol priority circuit 70 as the F/P signal.

Figure 22:
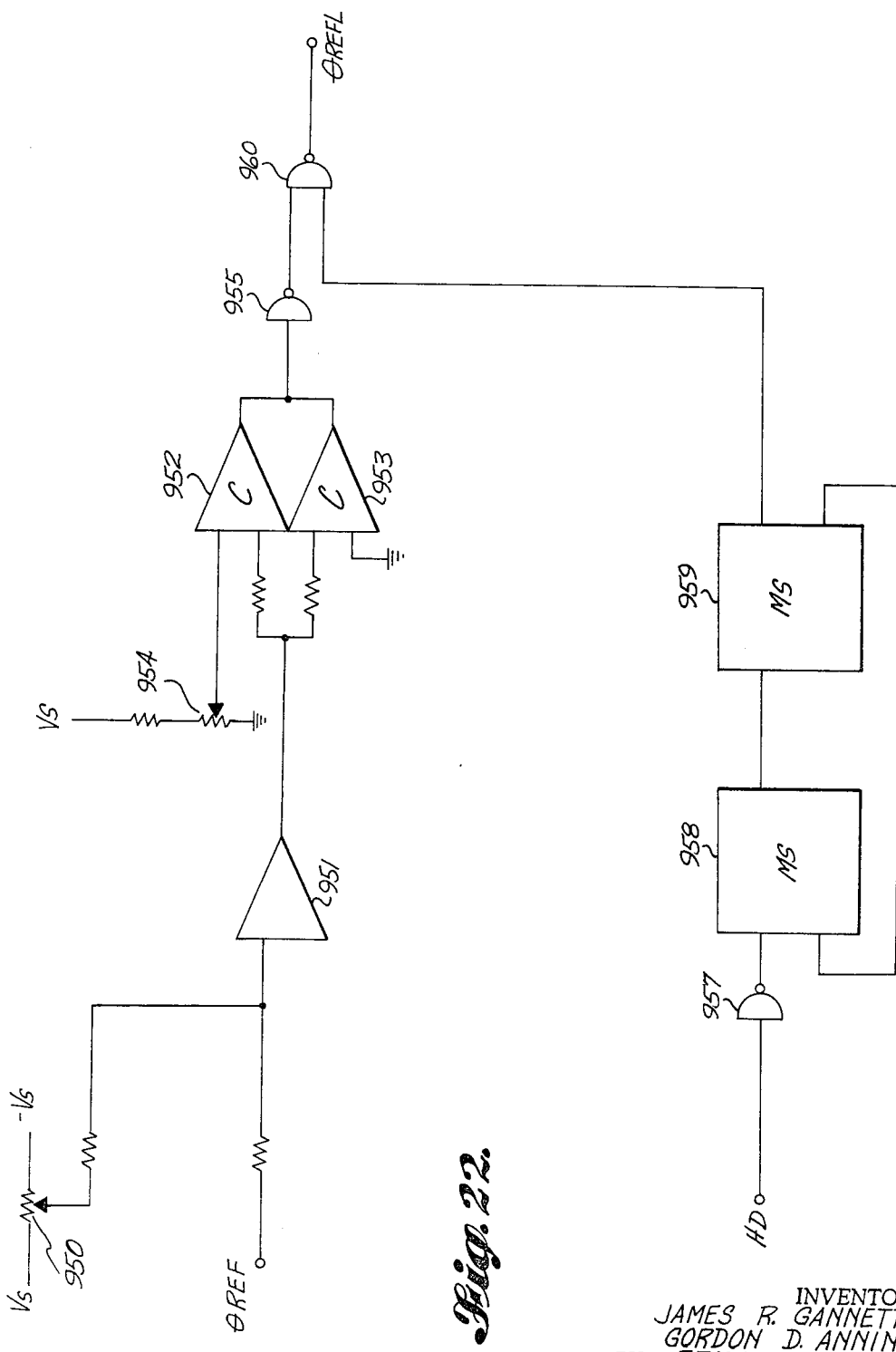
FIG. 22 is a detailed logic diagram of the pitch reference symbol generating circuit 60 of FIG. 5.

The PITCH REFERENCE LINE symbol is generated according to the teachings of FIG. 22. The pilot-controlled pitch reference circuit 24 supplies a $\theta$REF signal to the input of an amplifier 951. A second input to amplifier 951 is provided by the VCST2 signal, and a third input is provided by a reference voltage obtained from the tap of a potentiometer 950. The output of amplifier 951 comprises the vertical composite sawtooth, as modified for pitch, or VCST2, and as further level-shifted to locate the desired symbol. This output is supplied to opposing inputs of dual comparators 952 and 953. The other input of comparator 952 is supplied with ground potential, and the other input of comparator 953 with a reference voltage obtained from a potentiometer 954. The pulse output of comparator 953 defines the upper edge of the symbol, and that of comparator 952 the lower edge thereof.

As can be noted from FIG. 1, the PITCH REFERENCE LINE symbol comprises a dashed line extending across the CRT screen. The dashes are formed by inverting the HD signal by a NOT element 957 and supplying that signal to an astable multi-vibrator comprising two monostable multi-vibrators 958 and 959. The astable output thereof is supplied as one input to a NAND gate 960, whose other input is furnished with the outputs of comparators 952 and 953, as inverted by a NOT element 955. Size-defining pulses appear on the output of NAND gate 960 to define the vertical position and extent, and horizontal dashes of the PITCH REFERENCE LINE symbol. These pulses are supplied to generator 58 as the $\theta$REFL signal.

As related previously, mode control circuit 72 is controlled by the pilot to determine which symbols are to be displayed. By considering the embodiment thereof illustrated in FIG. 7 and the symbol priority circuit 70 illustrated in FIG. 8, one can see that the AIRPLANE, ROLL MARKER, ARTIFICIAL HORIZON, and positive and negative PITCH LINE symbols are always displayed in the basic mode. There are five additional modes in which the display may be operated. First, in an altitude mode, the ALTITUDE NUMBERS and ALTITUDE BOX symbols are displayed. Second, in a TV mode, the real world image is displayed. Third, in a flight director mode, the PITCH COMMAND and ROLL COMMAND symbols, the SPEED ERROR symbol, the POTENTIAL FLIGHT PATH ANGLE and FLIGHT PATH ANGLE symbols are displayed. Fourth, in an ILS mode, the ILS GATE symbol, the ALTITUDE NUMBERS and ALTITUDE BOX symbols are displayed. In the last mode, all symbols are displayed.

Figure 7:
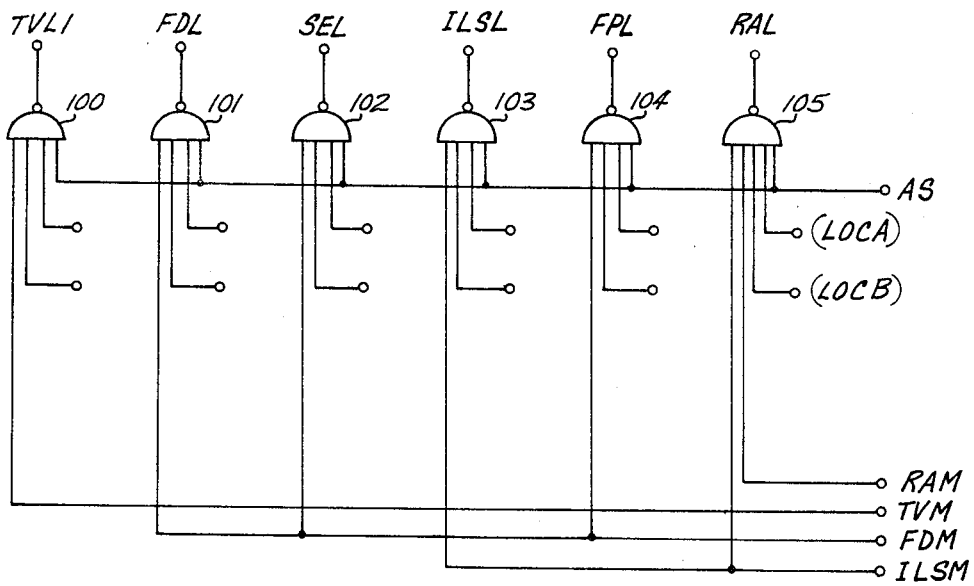
FIG. 7 is a detailed logic diagram of the mode control circuit of FIG. 5.

With particular reference to FIG. 7, a plurality of NAND gates 100–105 provide for these combinations of symbology. These gates have connected to their inputs signals RAM, TVM, FDM, ILSM, and AS, which correspond to the five modes previously mentioned. The input signals may be produced, for example, by a simple mechanical switch operated by the pilot. The output of gates 100–105, or signals TVL1, FDL, SEL, ILSL, FPL, and RAL, are connected to the priority circuit 70 to be gated with the corresponding signals from the plurality of symbol generators. In addition to the five modes described, the embodiment of FIG. 7 provides for individual selection of these symbols, by means of individually connected signals to the LOCA and LOCB terminals of gates 100–105.

Figure 8:
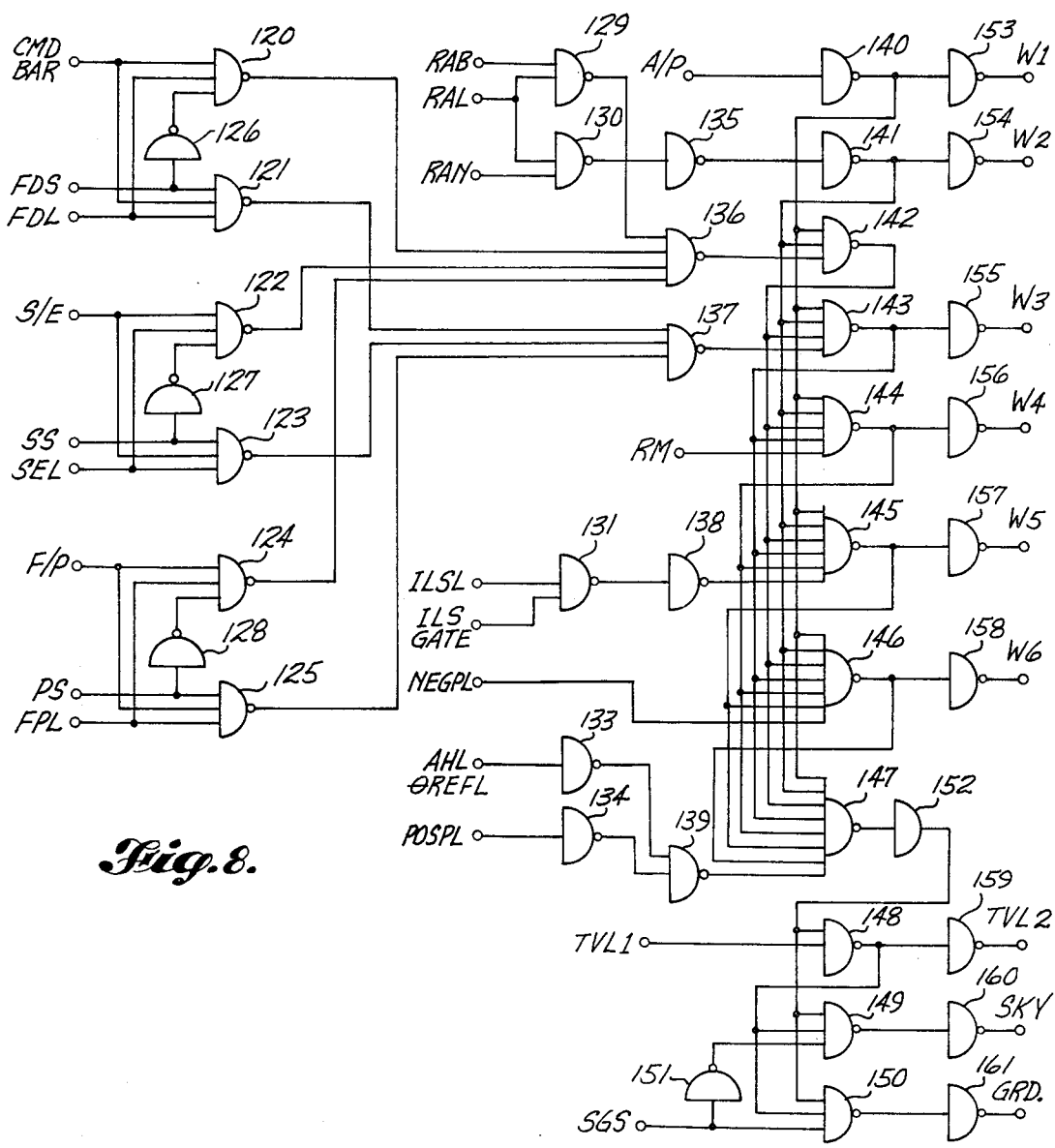
FIG. 8 is a detailed logic diagram of the symbol priority circuit of FIG. 5.

The logic used in the symbol generators provides that the output signal thereof is a logic "1" during the time when the symbol or symbols designated by that output are to be displayed. The logic means in FIG. 8 is designed to produce the priority of symbols discussed previously, and to appropriately combine symbols of the same shading for connection to the video mixer 80.

In detail, a plurality of NAND gates 120–125, together with three corresponding NOT elements 126–128, provide any desired combination of shading of the PITCH COMMAND, ROLL COMMAND, SPEED ERROR, POTENTIAL FLIGHT PATH ANGLE and FLIGHT PATH ANGLE symbols. The FDL signal from mode control circuit 72, an FDS signal obtained from symbol shade circuit 13 and the CMD BAR signal from generator 38, are supplied to the inputs of NAND gate 121, and the CMD BAR and FDL signals, and the FDS signal as inverted by NOT element 126, are supplied to the inputs of NAND gate 120. Depending on whether or not the FDS signal is a logic "1" or a logic "0", gate 121 or 120 produces an output signal. If an output is provided by NAND gate 120, the succeeding logic circuitry determines that the symbol displayed during that period is black, whereas if an output is provided by NAND gate 121, the succeeding logic circuitry determines that the symbol displayed during that period is gray or white.

Similarly, outputs from NAND gates 122 and 124 denote a black symbol, whereas outputs from NAND gates 123 and 125 denote a gray or white symbol. Therefore, by appropriately choosing the FDS, SS, and PS signals supplied to these three groups of NAND gates, the shading of the symbols produced thereby can be varied.

The outputs of "black" NAND gates 120, 122, and 124 are combined in a NAND gate 136, while the outputs of "white" NAND gates 121, 123, and 125 are combined in a NAND gate 137. Also supplied to NAND gate 136 is the output of a NAND gate 129 which has connected thereto the RAB and RAL signals from generator 44 and control circuit 72, respectively. The RAL signal is also applied to a NAND gate 130 together with the RAN signal from generator 42.

Also provided in the priority circuit 70 are NOT elements 140 and 141, and a plurality of NAND gates 142–150. These NOT elements and NAND gates determine the relative priority of the symbols according to the schedule set forth previously. As mentioned, the AIRPLANE and ALTITUDE NUMBERS symbols have the highest priority, and they are accordingly coupled directly to the video mixer 80 as signals W1 and W2 by NOT elements 140 and 153, and NOT elements 135, 141, and 154, respectively.

The next priority grouping includes the PITCH COMMAND and ROLL COMMAND, SPEED ERROR, FLIGHT PATH ANGLE, POTENTIAL FLIGHT PATH ANGLE, and ALTITUDE BOX symbols, and this priority is established by NAND gates 142 and 143 which have connected thereto the outputs of "black" NAND gate 136 and "white" NAND gate 137, together with the outputs from NOT elements 140 and 141. The output of NAND gate 142 is connected to the input of NAND gate 143. In this manner, "black" symbols within this class take priority over "white" symbols therein. If any of the inputs supplied to the NAND gates 142 or 143 is a logic "0," the output thereof is a logic "1." Therefore, if either NOT element 140 or 141 produces a logic "0" output, such as occurs when either the A/P or RAN signals are connected thereto, gate 142 produces a logic "1" output. If neither of those signals is present at the input of gate 142, a logic "0" output is provided thereby only if "black" gate 136 produces a logic "1" at its output which occurs only when the RAB or the appropriately chosen CMD BAR, S/E, and F/P signals are connected thereto.

Similarly, NAND gate 143 provides a logic "1" output whenever any of the inputs thereto has a logic "0" thereon. Thus, if either of NOT elements 140 or 141 produces an output signal, the input to NAND gate 143 is a logic "0" and a logic "1" is produced at the output thereof. If neither of elements 140 or 141 produces an output signal, then if NAND gate 142 produces an output signal, the input of NAND gate 143 is a logic "0" and logic "1" is still produced at the output thereof. This logic "1" output on NAND gate 143 is inverted by a NOT element 155 and supplied to the video mixer 80 as signal W3. Therefore, if either the W1, W2, or "black" signals connected to NAND gate 136 are present, they take priority over any signal connected to NAND gate 143 from NAND gate 137 and the signal W3 denotes a "black" trace on the CRT. If none of these signals is present, and the output of NAND gate 137 is logic "1," as occurs when any of the input signals is connected thereto, the output of NAND gate 143 is a logic "0" and accordingly the signal W3 is a logic "1", denoting a "gray" or "white" trace on the CRT.

The RM signal is connected directly to NAND gate 144, as are the outputs from elements 140 and 141, and NAND gates 142 and 143. Therefore, the symbols represented by the signals connected to these prior elements and gates take precedence over the ROLL MARKER symbol. If none of those signals is present, and the RM signal is present, the output of NAND gate 144 is a logic "0" which is inverted by NOT element 156 and supplied to the priority circuit as signal W4.

Similar analysis shows that the remaining signals obtained from the symbol generators are of descending stages of priority. Therefore, the ILS GATE signal is switched by the ILSL signal from circuit 72 in a NAND gate 131, inverted by NOT element 138, and supplied to NAND gate 145 whose output is coupled to video mixer 80 by a NOT element 157 as the signal W5. The NEGPL signal is connected directly to a NAND gate 146 whose output is coupled to video mixer 80 as the W6 signal by a NOT element 158.

The AHL, $\theta$REFL signal is first applied to a NOT element 133 and the POSPL signal to a NOT element 134. The outputs of these elements are combined in a NAND gate 139 whose output is connected to a NAND gate 147. The output of NAND gate 147 is coupled through a NOT element 152 to the input of NAND gate 148 which also has as its input the TVL1 signal from control circuit 72. The functional operation of NAND gates 147 and 148 is similar to that of gates 142 and 143, in that the former represents a "black" trace on the CRT, and in that the latter represents the "white" or "gray" trace on the CRT screen. The output of NAND gate 148 is connected to video mixer 80 as the TVL2 signal by NOT element 159. Similarly, the SGS signal is inverted by NOT element 151, and applied through NAND gates 149 and 150, and NOT elements 160, 161 as the SKY and GROUND signals to video mixer 80.

The output signals W1–W6, TVL2, SKY and GROUND from symbol priority circuit 70 are connected to separate DC voltage generating circuits in video mixer 80. Each of these circuits provides a DC voltage which is used to amplitude modulate the sync pulses from sync generator 78 to form the composite EADI video waveform. As with any standard TV composite waveform, the degree of amplitude modulation determines the intensity of the CRT beam, and thus the "-blackness" or "whiteness" of the CRT trace.

Figure 9:
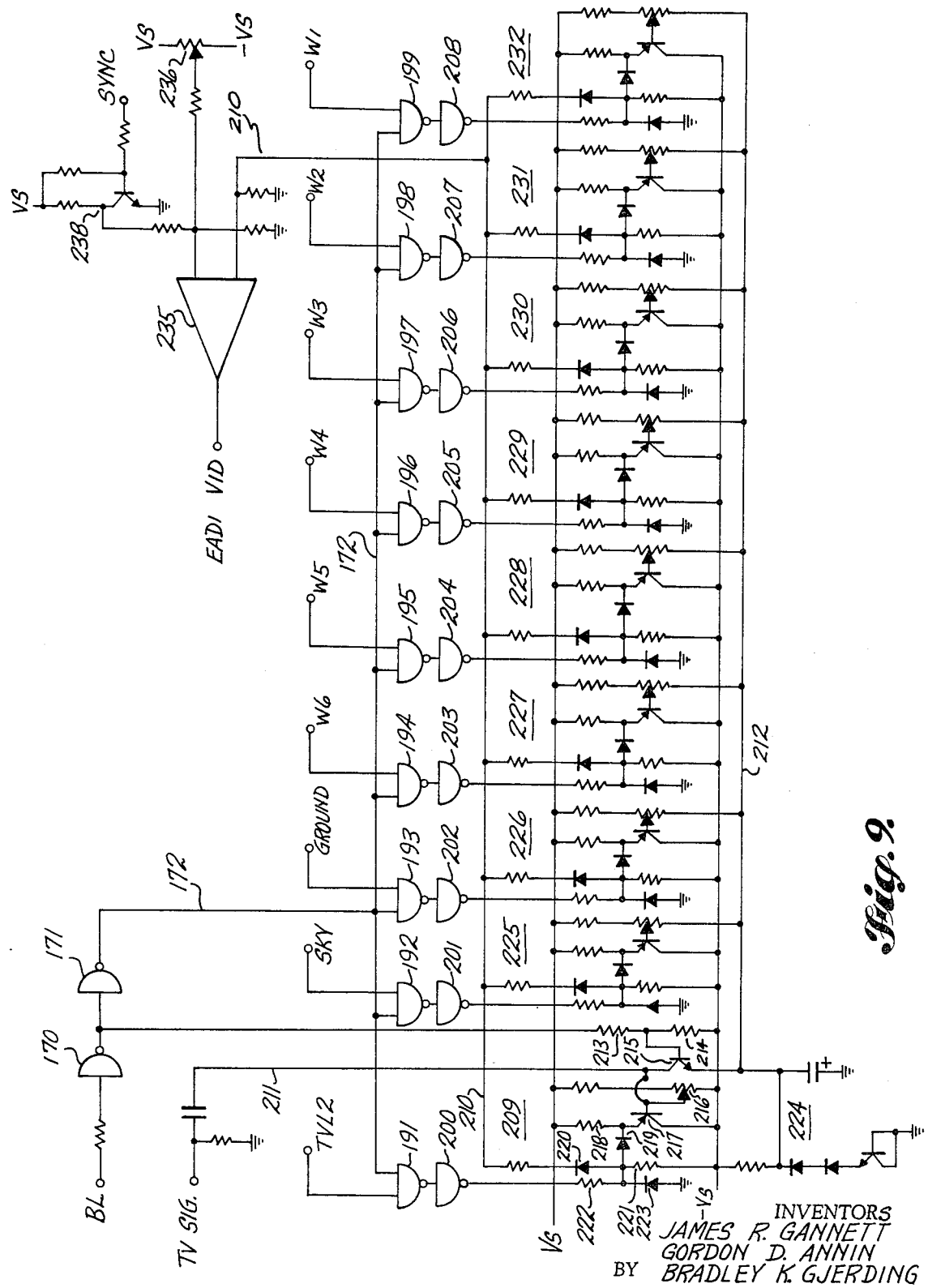
FIG. 9 is a detailed schematic and logic diagram of the video mixing circuit of FIG. 5.

With particular reference to FIG. 9, the blanking signal BL from sync generator 78 is connected through NOT elements 170 and 171 to a bus 172 which in turn is connected to one input each of a plurality of NAND gates 191–199. The other inputs to these plurality of NAND gates are provided by the outputs of priority circuit 70. The outputs of NAND gates 191–199 are inverted by NOT elements 200–208, and supplied to a plurality of DC voltage generating circuits 209, 225–232. With the exception of circuit 209, these circuits are identical. The output of NOT element 170, which is the inverted BL signal, is also connected to circuit 209, as is the signal TV SIG from the TV camera 10.

In circuit 209, a voltage divider comprising resistors 213 and 214 is connected between BL signal and the voltage supply $-V_s$. The TV SIG is applied through a transistor switch 215 to a common bus 212 which has connected thereto a biasing voltage from a circuit 224. Circuit 209 also comprises a potentiometer 216 connected between $V_s$ and $-V_s$ whose tap is connected to TV SIG and to the control electrode of a transistor switch 217. The emitter of switch 217 is connected to $V_s$ through a resistor 218 and the collector thereof directly to $-V_s$. The output of NOT element 200 is connected to ground potential through a series-connected resistor 222 and diode 223. The common point thereof is connected via a diode 219 to the emitter of switch 217 and via a diode 220 to a common output bus 210. Finally, a resistor 221 connects the common point of diodes 223 and 219 to $-V_s$.

In operation, the network comprising diodes 219, 220 and 223 is switched by the TVL2 and BL signals to alternately connect the TV SIG or a "black" signal to common output line 210. Assuming that the BL signal is a logic "1," as is the case when blanking is not to be effected, the DC voltage obtained from TV SIG and present at the collector of switch 215 is coupled through switch 217 to the common junction of diode 219, resistor 218, and switch 217. This signal has a varying, positive polarity. If the TVL2 signal is also a logic "1," the output of NOT element 200 is likewise a logic "1" so that diode 219 is forward-biased, permitting the positive TV SIG to be coupled through diode 220 to common bus 210. If the BL signal is a logic "0," switch 215 is energized thereby to shunt TV SIG to ground. In addition, the output of NOT element 200 is a logic "0" and diode 219 is reverse-biased. Common bus 210 is then supplied with a voltage through diodes 223 and 220. The forward voltage drops occurring in diodes 223 and 220, when added to ground potential, result in a negative voltage on bus 210 to result in the display of a black symbol. The function of circuit 224 is to reference the TV SIG to this "-black" level, as the voltage supplied therefrom to switch 215 is an equivalent negative voltage. An additional advantage of using switch 215 to control the connection of TV SIG to the output line 210 is to remove unwanted sync components occurring from the sweep circuits in camera 10. Accordingly, when the BL signal is present, TV SIG is completely isolated from the output line 210. Potentiometer 216 determines the relative brightness of the CRT trace of the real world image represented by TV SIG.

Circuits 225–232 function in an identical manner, but add a DC voltage to common bus 210 when the diode networks therein are released by the outputs of NOT elements 201–208. The magnitude of these DC voltages is determined by the setting of the potentiometers therein connected between $V_s$ and the output of biasing circuit 224. In this manner, various shades of gray corresponding to the desired symbology shading are produced.

Bus 210 is connected as one input to a summing amplifier 235 which is also provided with a reference voltage from a potentiometer 236 and the SYNC signal from generator 78 as coupled through an amplifier 238. The output of summing amplifier 235 comprises the standard EIA video composite waveform which comprises amplitude-modulated horizontal and vertical sync pulses, and equalizing pulses.

The symbol priority logic of circuit 70 determines that only one of the signals W1–W6, TVL2, SKY or GROUND is present at any one time. Thus, there is only one DC voltage connected to common bus 210 at any given time, and the sync pulses coupled to summing amplifier 235 are amplitude-modulated thereby to produce a CRT trace of the required intensity.

Although the invention has been described with respect to detailed embodiments of each circuit element, it should be understood that the invention could be implemented in many alternative ways. For example, the terms vertical and horizontal, whenever used throughout the specification and the following claims, are not to be construed as limiting, as it is apparent that the terms have relevance only to one particular scheme of raster modulation, that is, one in which the CRT beam traces the tube 90 horizontally.

Likewise, it is not believed that a complete description of the operation and use of this flight management display, other than that heretofore related, is required. The utility of this display and the advantages that flow from its precise and accurate depiction of pertinent flight information in a unitary manner will be quite apparent to any pilot or other person familiar with the conditions of flight.

The capability that this system provides in transforming flight parameter information obtained from any sensing means to a unitary display makes it ideally suited for use in flight simulators. In a similar vein, techniques of this system heretofore described are adaptable for the display of any flight parameter that can assist the pilot in his flight management decisions and that is embodied in a signal obtained from a suitable sensing means.

Therefore, it is to be clearly understood by those skilled in the art that the invention is not limited to the embodiments of this specification, and in fact is intended to be bounded only by the limits of the appended claims.

We claim:

1. A system for providing an integrated display of flight information obtained from a plurality of sensors and controls which are disposed on an aircraft and which supply information signals representative of a plurality of flight parameters, comprising:
   a. means providing synchronizing pulses;
   b. a plurality of symbol generators having as inputs thereto said synchronizing pulses, one of said symbol generators converting said synchronizing pulses into an output pulse whose timing and duration is related thereto and which defines the location and size of a reference symbol with which the remaining symbols are to be visually compared, the remaining of said symbol generators additionally having as an input thereto at least one of the information signals from said plurality of sensors and controls and accordingly converting said synchronizing pulses and said information signal into an output pulse whose timing and duration is related to said synchronizing pulses and which defines the location and size of a symbol corresponding to a flight parameter;
   c. a priority means including means combining said plurality of output pulses into various groups corresponding to desired symbol shading, and further including gating means coupling one of said combined pulses to its output in accordance with a schedule determining priority of symbol display; and
   d. a mixing means converting the output pulse from said priority circuit into a voltage whose magnitude is proportional to the desired symbol shading, and including means amplitude modulating said synchronizing pulses in response to said voltage to produce a composite video signal suitable for reproduction on a conventional television receiver.

2. A system as recited in claim 1, further comprising:
   a. mode control means producing a plurality of control signals which are representative of symbols to be actually displayed, and
   b. a second gating means which is connected between said combining means of said priority means and the output pulses from said plurality of symbol generators, said second gating means having also connected thereto said plurality of control signals from said mode control means and operative to pass those of said output pulses which correspond to the symbols to be displayed.

3. A system as recited in claim 1, further comprising:
   a. means producing a real world signal representing an image of an area adjacent the aircraft, and
   b. means within said mixing means for combining said real world signal with said voltage to produce said composite video signal.

4. A system as recited in claim 1 wherein:
   a. said synchronizing pulses include vertical drive pulses and horizontal drive pulses defining, respectively, the relative timing and duration of desired vertical and horizontal scanning intervals of a standard television picture frame,
   b. each of said symbols comprises one or more rectangular units defined by one of said output pulses, and
   c. each of said symbol generators comprises means producing a horizontal size-defining pulse whose duration defines the horizontal extent, when reproduced, of the rectangular units comprising each symbol and whose timing relative to that of said horizontal drive pulse determines the horizontal location thereof, means producing a vertical size-defining pulse whose duration defines the vertical extent, when reproduced, of the rectangular units comprising each symbol and whose timing relative to that of said vertical drive pulse determines the vertical location thereof, and means combining said vertical and said horizontal size-defining pulses to produce said output pulse from said symbol generator.

5. A system as recited in claim 4 wherein the reference symbol generated by the first-mentioned symbol generator comprises an aircraft replica, and wherein said first-mentioned symbol generator further comprises:
   a. a digital counter clocked by said horizontal drive pulses and reset by said vertical drive pulses, said counter producing a series of pulses whose timing relative to said vertical drive pulse defines the vertical dimensions of said replica,
   b. means producing from said horizontal drive pulses a plurality of pulses which are successively delayed therefrom to define the horizontal dimensions of said replica, and
   c. means combining the pulses from said digital counter and from said delaying means to produce said output pulse from said first-mentioned symbol generator.

6. A system as recited in claim 4 wherein one of said flight parameter symbols comprises a rectangle denoting permissible limits of the aircraft's flight path with respect to ILS localizer deviation and glide slope deviation signals obtained from an ILS receiver, and wherein one of said symbol generators comprises:
   a. a first means connected to said horizontal drive pulse and the localizer deviation signal and producing therefrom a pulse whose timing relative to said horizontal drive pulse is varied in proportion to said localizer deviation signal,
   b. a second means connected to said vertical drive pulse and to the glide slope deviation signal and producing therefrom a pulse whose timing relative to said vertical drive pulse is varied in proportion to said glide slope deviation signal,
   c. means having the pulse from said first means connected thereto and producing therefrom a plurality of pulses which are successively delayed therefrom so as to define the horizontal dimensions of the rectangle,
   d. means having connected thereto the pulse from said second means and producing therefrom a plurality of pulses which are successively delayed therefrom to define the vertical dimensions of the rectangle, and
   e. gating means combining the plurality of successively delayed pulses to form said output pulse from said symbol generator.

7. A system as recited in claim 4 wherein one of said flight parameter symbols comprises first and second rectangles denoting, respectively, the outputs of a flight director computer which provides pitch and roll command signals, and wherein one of said symbol generators comprises:
   a. first means connected to said vertical drive pulse and to the pitch command signal for producing a pulse whose timing relative to said vertical drive pulse is varied in proportion to said pitch command signal, b. second means connected to said horizontal drive pulse and to the roll command signal for producing therefrom a pulse whose timing relative to said horizontal drive pulse is varied in proportion to said roll command signal, c. means producing from said horizontal drive signal first and second pulses which are successively delayed therefrom, d. means producing from said vertical drive pulse third and fourth pulses which are successively delayed therefrom, and e. gating means combining said first, second, third and fourth pulses and said plurality of pulses from said first and second means to produce said output pulse from said symbol generator.

8. A system as recited in claim 4 wherein one of said flight parameter symbols comprises first and second rectangles, the first rectangle remaining fixed with relation to said reference symbol and the other rectangle varying in size and position in accordance with the information content of a speed error signal and wherein one of said symbol generators comprises:

a. means connected to said vertical drive pulse for producing a first pulse whose timing and duration relative thereto determines the vertical extent of the first rectangle, b. means connected to said vertical drive pulse and to the speed error signal and producing therefrom a pulse whose timing and duration relative to said vertical drive pulse is varied in proportion to said speed error signal to determine the vertical extent of the second rectangle, c. storage means having said first and second pulses connected thereto and producing a pulse therefrom as long as one of said input pulses is being produced, and d. means having said horizontal drive pulse connected thereto and producing therefrom a pulse which is delayed to define the horizontal dimensions of the first and second rectangles, and means combining this pulse with the output of said storage means to form said output pulse from said symbol generator.

9. A system as recited in claim 4 wherein one of said flight parameter symbols comprises a plurality of rectangles whose selective display represents the information signal from an altitude sensor, wherein one of said symbol generators comprises:

a. a converter means producing from the output signal a corresponding digital signal embodying the altitude information, b. a digital counter which is clocked by said horizontal drive pulses and reset by said vertical drive pulse, said counter producing a series of pulses whose timing relative to said vertical drive pulse defines the vertical dimensions, when reproduced, of the rectangles, c. means providing from each of said horizontal drive pulses a plurality of pulses which are successively delayed therefrom to define the horizontal dimensions of the rectangles, and d. gating means selectively combining said pulses from said delay means and said digital counter in accordance with the altitude information content of said digital signal to thereby produce said output pulse from said symbol generator.

10. A system as recited in claim 9, further comprising means coupled to said horizontal drive pulses and to said vertical drive pulse and producing therefrom a pulse whose timing relative to each of said horizontal drive pulses is varied in proportion to said vertical drive pulse, said pulse being coupled to said delaying means in place of said horizontal drive signal so that the vertical dimensions of the rectangles slant, when reproduced.

11. A system as recited in claim 9 wherein the flight parameter symbol further includes a background rectangle when displayed, and wherein said symbol generator further comprises:

a. first means delaying said horizontal drive pulse to produce a pulse defining the horizontal dimensions of said rectangle, b. second means delaying said vertical drive pulse to produce a pulse defining the vertical dimensions of said rectangle, c. means providing an output signal when the information content of the altitude signal is less than a predetermined, minimum value, d. flasher means actuated in response to said output signal from said comparing means to provide a series of pulses occurring at a regular rate, and e. means combining the pulses from said first and second means and from said flasher means to produce said output pulse from said symbol generator.

12. A system as recited in claim 1 wherein one of the sensors provides an information signal proportional to roll attitude of the aircraft, and wherein said plurality of remaining symbol generators are divided into two groups, those of said first group providing output pulses defining symbols which rotate with changes in the roll attitude, and those of said second group providing output pulses defining symbols which do not so rotate.

13. A system as recited in claim 12 wherein:

a. said plurality of synchronizing pulses include a plurality of vertical drive pulses and horizontal drive pulses defining, respectively, the relative timing and duration of the desired vertical and horizontal scanning intervals of a standard television picture frame, b. each of said symbols comprises one or more rectangular units defined by one of said output pulses, c. means producing first and second signals, respectively, proportional to the cosine and sine of the roll attitude signal, d. a composite sawtooth waveform signal generator including i. means producing a sawtooth waveform every horizontal drive pulse whose amplitude is controlled by said first signal, ii. means producing a sawtooth waveform every vertical drive pulse whose amplitude is controlled by said second signal, iii. means combining said first and second sawtooth waveforms to produce a horizontal composite waveform signal, iv. means producing a sawtooth waveform every horizontal drive pulse whose amplitude is controlled by said second signal, v. means producing a sawtooth waveform every vertical drive pulse whose amplitude is controlled by said first signal, and vi. means combining said third and fourth sawtooth waveforms to produce a vertical composite waveform signal, e. each of said symbol generators in said first group comprises means producing a horizontal size-defining pulse whose duration defines the horizontal extent, when reproduced, of the rectangular units comprising each symbol and whose timing relative to that of said horizontal composite waveform signal determines the horizontal location thereof, means producing a vertical size-defining pulse whose duration defines the vertical extent, when reproduced, of the rectangular units comprising each symbol and whose timing relative to that of said vertical composite waveform signal determines the vertical location thereof, and means combining said vertical and said horizontal size-defining pulses to produce said output pulse from said generator.

14. A system as recited in claim 13 wherein one of said flight parameter symbols comprises a rectangle denoting roll attitude and wherein one of said symbol generators in said first group comprises:

a. first means producing said vertical size-defining pulse throughout a predetermined range of values of said vertical composite waveform signal, and b. second means producing said horizontal size-defining pulse throughout a predetermined range of values of said horizontal composite waveform signal.

15. A system as recited in claim 13 wherein:
  a. one of the sensors provides a signal proportional to pitch attitude of the aircraft,
  b. said plurality of symbol generators in said first group provide output pulses defining symbols which are vertically shifted, when reproduced, with changes in pitch attitude, and
  c. said composite sawtooth waveform generator further comprises means level-shifting said vertical composite waveform signal in response to the pitch attitude signal.

16. A system as recited in claim 15 wherein one of said flight parameter symbols comprises a plurality of horizontally extending lines which are vertically spaced in increments of pitch attitude and wherein one of said symbol generators comprises:
  a first means producing a plurality of horizontal size-defining pulses during corresponding, predetermined ranges of said horizontal composite waveform signal, and
  b. second means producing a plurality of vertical size-defining pulses during corresponding, predetermined ranges of said level-shifted, vertical composite waveform signal.

17. A system as recited in claim 15 wherein one of said flight parameter symbols comprises a rectangle whose vertical displacement from said reference symbol, when reproduced, indicates the relative flight path angle of the aircraft, wherein a corresponding signal is provided from a flight path angle sensor, and a modification signal from a drift angle sensor, and wherein one of said symbol generators comprises:
  a. first means summing said level-shifted, vertical composite waveform signal with the output of the flight path angle sensor,
  b. second means summing said horizontal composite waveform signal with the output of the drift angle sensor,
  c. first means producing said vertical size-defining pulse throughout a predetermined range of values of the output signal from said first summing means, and
  d. second means producing said horizontal size-defining pulse throughout a predetermined range of values of the output from said second summing means.

18. A system as recited in claim 17 wherein another of said flight parameter symbols comprises a rectangle whose vertical displacement from said reference symbol, when reproduced, indicates the potential flight path angle of the aircraft, wherein a sensor is provided which furnishes an output signal representative of aircraft acceleration, and wherein said symbol generator further comprises:
  a. means producing a reference signal,
  b. third means summing said reference signal, the output of the acceleration sensor, and the output of said first summing means,
  means producing said vertical size-defining pulse for the potential flight path angle symbol throughout a predetermined range of values of the output from said third summing means, and
  d. means producing said horizontal size-defining pulse for the potential flight path angle symbol throughout a predetermined range of values of the output from said second summing means.

19. An apparatus for providing relevant flight information to a pilot during landing maneuvers of an aircraft, comprising:
  a. means scanning the area preceding the aircraft and providing a corresponding output signal,
  b. means sensing acceleration of the aircraft along its flight path and providing an output signal proportional thereto,
  c. means sensing the angle of the aircraft's flight path relative to the horizon and providing an output signal proportional thereto,
  d. means sensing the pitch attitude of the aircraft relative to the horizon and providing an output signal proportional thereto,
  e. means providing an output signal from said pitch attitude output signal which defines the relative position of the horizon,
  f. means summing the output signals from said acceleration sensing means and said flight path angle sensing means to provide an output signal which defines the relative position of the aircraft's potential flight path angle,
  g. a display means, and
  h. means coupling the output signal from said scanning means, the output signal from said flight path angle sensing means, and the output signal from said summing means to said display means so that indication is made thereby of the relative position of the horizon, the aircraft's flight path angle, and the aircraft's potential flight path angle, said indications being displayed in a 1:1 relationship with a reproduction of the area preceding the aircraft.

* * * * *